(12) United States Patent
Kim et al.

(10) Patent No.: US 11,133,536 B2
(45) Date of Patent: Sep. 28, 2021

(54) APPARATUS AND METHOD FOR MANAGING BATTERY

(71) Applicant: SAMSUNG ELECTRONICS CO., LTD., Suwon-si (KR)

(72) Inventors: YoungJae Kim, Seoul (KR); Jinyong Jeon, Yongin-si (KR); Younghun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 662 days.

(21) Appl. No.: 15/890,664

(22) Filed: Feb. 7, 2018

(65) Prior Publication Data

US 2019/0067755 A1 Feb. 28, 2019

(30) Foreign Application Priority Data

Aug. 28, 2017 (KR) .......................... 10-2017-0108791

(51) Int. Cl.
*H01M 10/44* (2006.01)
*H01M 10/42* (2006.01)
(Continued)

(52) U.S. Cl.
CPC ....... *H01M 10/441* (2013.01); *H01M 10/425* (2013.01); *H01M 10/4257* (2013.01); *H01M 10/443* (2013.01); *H02J 7/0014* (2013.01); *H02J 7/0021* (2013.01); *H02J 7/025* (2013.01); *H02J 7/342* (2020.01); *H02J 50/10* (2016.02); *H02J 50/80* (2016.02); *H01M 10/48* (2013.01);
(Continued)

(58) Field of Classification Search
CPC ........ H02J 7/342; H02J 7/0014; H02J 7/0021; H02J 50/80; H01M 10/441; H01M 10/4257; H01M 10/443; H01M 2010/4271
USPC .......................................... 320/103, 108, 112
See application file for complete search history.

(56) References Cited

U.S. PATENT DOCUMENTS 9,214,822 B2   12/2015  Hartley et al.
9,293,935 B2 *  3/2016  Lee .......................... H04Q 9/00
(Continued)

FOREIGN PATENT DOCUMENTS

EP     2 328 223 A1    6/2011
EP     2 565 959 A2    3/2013
(Continued)

OTHER PUBLICATIONS

Extended European Search Report dated Nov. 30, 2018 in corresponding European Patent Application No. 181876160 (8 pages in English).

*Primary Examiner* — Edward Tso
*Assistant Examiner* — Aaron Piggush
(74) *Attorney, Agent, or Firm* — NSIP Law

(57) ABSTRACT

Provided are battery management apparatuses and methods. The battery management apparatus includes a converter configured to acquire and convert information of a battery cell, an antenna configured to transmit the converted information to an adjacent battery cell and to receive converted information of the adjacent battery cell, in response to a command of a controller, and a coil configured to wirelessly charge or discharge the adjacent battery cell, in response to another command of the controller, wherein the controller is (Continued)

configured to control the wireless charging or the wireless discharging based on information of the adjacent battery cell.

21 Claims, 19 Drawing Sheets

(51) Int. Cl.
| | | |
|---|---|---|
| *H02J 7/00* | (2006.01) | |
| *H02J 7/02* | (2016.01) | |
| *H02J 50/80* | (2016.01) | |
| *H02J 50/10* | (2016.01) | |
| *H02J 7/34* | (2006.01) | |
| *H01M 10/48* | (2006.01) | |

(52) U.S. Cl.
CPC .. *H01M 10/486* (2013.01); *H01M 2010/4271* (2013.01); *H01M 2220/20* (2013.01)

(56) References Cited

U.S. PATENT DOCUMENTS

| | | | |
|---|---|---|---|
| 2007/0103110 A1* | 5/2007 | Sagoo | H02J 7/00302 320/109 |
| 2014/0191568 A1* | 7/2014 | Partovi | H02J 50/80 307/9.1 |
| 2015/0194839 A1* | 7/2015 | Wojcik | H01M 10/425 320/108 |
| 2016/0268642 A1 | 9/2016 | Yamazoe et al. | |

FOREIGN PATENT DOCUMENTS

| | | |
|---|---|---|
| EP | 3 190 803 A1 | 7/2017 |
| JP | 4484196 B2 | 6/2010 |
| JP | 5208714 B2 | 6/2013 |
| JP | 5677171 B2 | 2/2015 |
| JP | 5707571 B2 | 4/2015 |
| KR | 10-1564365 B1 | 10/2015 |
| KR | 10-2017-0023523 A | 3/2017 |

* cited by examiner

APPARATUS AND METHOD FOR MANAGING BATTERY

CROSS-REFERENCE TO RELATED APPLICATIONS

This application claims the benefit under 35 USC § 119(a) of Korean Patent Application No. 10-2017-0108791 filed on Aug. 28, 2017 in the Korean Intellectual Property Office, the entire disclosure of which is incorporated herein by reference for all purposes.

BACKGROUND

1. Field

The following description relates to an apparatus and system for battery management.

2. Description of Related Art

With the increasing importance on environmental issues and the focus on the dwindling energy resource, electric vehicle are increasingly coming in the spotlight as a mode for future transportation. The electric vehicle employs, as a main power source, a battery having a plurality of chargeable/dischargeable secondary cells are provided as a single pack.

A lifetime of a battery pack is important for the electric vehicle. When a capacity of the battery pack increases, the lifetime of the battery pack may increase. If a number of battery cells are increased in the battery pack to increase the lifetime of the battery pack, it may increase the cost and the size of the battery pack.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, that is provided a battery management apparatus including a converter configured to acquire and to convert information of a battery cell, an antenna configured to transmit the converted information to an adjacent battery cell and to receive converted information of the adjacent battery cell, in response to a command of a controller, and a coil configured to wirelessly charge or discharge the adjacent battery cell, in response to another command of the controller, wherein the controller is configured to control the wireless charging or the wireless discharging based on information of the adjacent battery cell.

The antenna may be configured as a near field communication (NFC) antenna.

The antenna may be provided on two opposing surfaces of the battery cell.

Information of the battery cell may include any one or any combination of a voltage, a current, and a temperature of the battery cell.

The converter may be an analog-to-digital (A/D) converter configured to convert information of the battery cell to a digital signal.

In another general aspect, that is provided a battery management apparatus including a plurality of batteries, a first controller configured to determine a state of each of the plurality of batteries based on information acquired from the plurality of batteries, and a first antenna configured to receive the information from the plurality of batteries and to transmit the state to the plurality of batteries in response to a command of the first controller, wherein each of the plurality of batteries comprises a battery cell, a converter configured to acquire and convert information of the battery cell, a second controller configured to control transmission and reception of the converted information, a second antenna configured to transmit the converted information to an adjacent battery cell and to receive converted information of the adjacent battery cell, in response to a command of a second controller, and a coil configured to wirelessly charge or discharge the adjacent battery cell, in response to another command of the second controller, wherein the second controller is configured to control the wireless charging or the wireless discharging based on information of the adjacent battery cell, and wherein the information comprises information of the battery cell that is included in each of the plurality of batteries.

The plurality of batteries may be connected in series.

The first antenna and the second antenna may be configured as a near field communication (NFC) antenna.

The second antenna may be provided on two opposing surfaces of the battery cell.

Information of the battery cell may include any one or any combination of a voltage, a current, and a temperature of the battery cell.

The converter may be an analog-to-digital (A/D) converter configured to convert information of the battery cell to a digital signal.

The state may include any one or any combination of state of charge (SOC) and state of health (SOH) of each of the plurality of batteries.

The first controller may be configured to perform battery balancing on the plurality of batteries based on the information.

The first controller may be configured to control the second controller to wireless charge or the wireless discharge the adjacent battery cell based on the information.

The first controller may be configured to perform the battery balancing based on SOC of the plurality of batteries.

The first controller may be configured to determine at least one battery having a minimum SOC, and to control the second controller to wirelessly discharge a battery, excluding the at least one battery, from among the plurality of batteries.

The first controller may be configured to determine at least one battery having a minimum SOC, and to control the second controller of the at least one battery to wireless discharge energy wirelessly charged from an adjacent battery.

The first controller may be configured to terminate the battery balancing, in response to the plurality of batteries having a matching SOC.

The second controller may be configured to provide a count of a number of the plurality of batteries to the first controller.

The first controller may be configured to adjust a temperature of one or more of the plurality of batteries based on a comparison of the temperature of the one or more of the plurality of batteries with a reference temperature.

The state of each of the plurality of batteries may include any one or any combination of State of Charge (SOC), State of Health (SOH), cold cranking amp (CCA), polarization resistance (PR), and internal resistance (IR).

The second antenna may be provided on a ferrite sheet.

In another general aspect, that is provided a method of operating the battery including transmitting a wake-up signal, by a master battery management system (M-BMS), to a first slave battery management system (S-BMS) of a first battery module from among battery module, acquiring, by the first S-BMS, information of the first battery module, in response to a receipt of the wake-up signal, transmitting information of the first battery module, by the first S-BMS, to a second S-BMS of a second battery module from among the battery module, acquiring, by the second S-BMS, information of the second battery module, in response to a receipt of the information of the first battery module, transmitting, by the second S-BMS, the information of the first battery module and the second battery module to the M-BMS, and determining, by the M-BMS, a state of the battery modules based on the information of the battery modules.

The transmitting of the information of the first battery module to the second S-BMS may include the transmitting of the information of the first battery module to the second S-BMS in a first direction, and the transmitting of the information of the first battery module and the second battery module to the M-BMS may include the transmitting of the information of the first battery module and the second battery module to the M-BMS in a second direction, wherein the first direction may be opposite to the second direction.

Other features and aspects will be apparent from the following detailed description, the drawings, and the claims.

Figure 1:
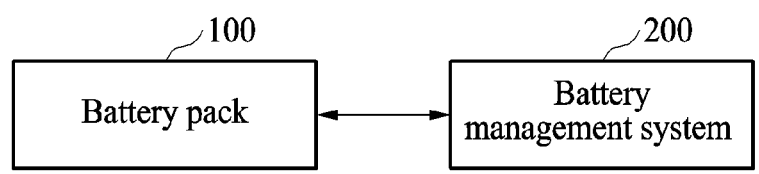
FIG. 1 illustrates an example of a battery apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are exemplary to merely describe the examples, and the scope of the examples is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or likewise, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise.

Hereinafter, examples will be described in detail with reference to the accompanying drawings, and like reference numerals in the drawings refer to like elements throughout.

Figure 2:
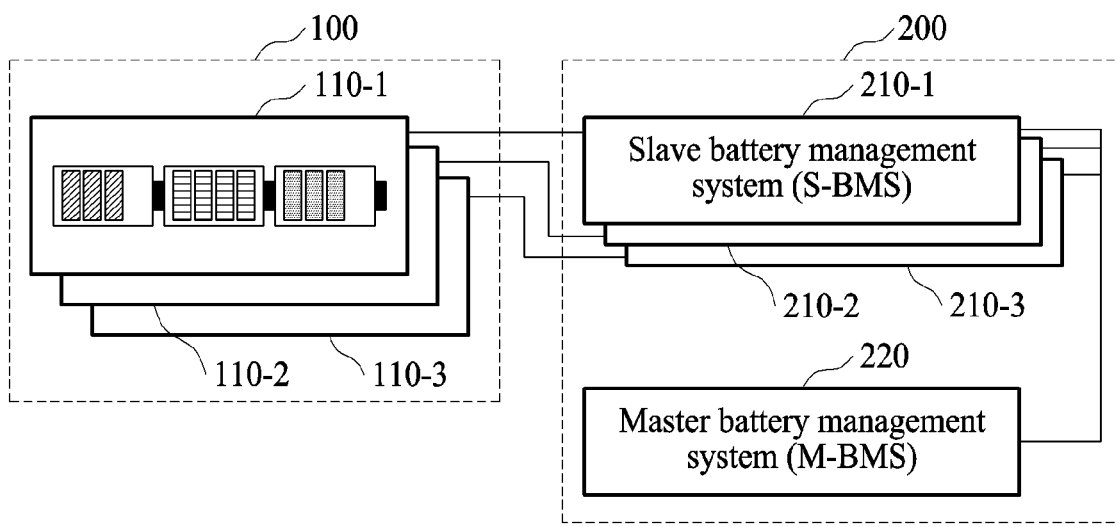
FIG. 2 is a diagram illustrating an example of the battery apparatus of FIG. 1.

FIG. 1 illustrates an example of a battery apparatus t, and FIG. 2 is a diagram illustrating an example of the battery apparatus of FIG. 1.

Referring to FIGS. 1 and 2, a battery apparatus 10 includes a battery pack 100 and a battery management system (BMS) 200.

The battery apparatus 10 may be applicable to any device to which a battery is applied. For example, the battery apparatus 10 may be provided to an energy storage system (ESS), an electronic device, and a transportation device. The transportation device refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an unmanned aerial vehicle, a drone, an autonomous vehicle, a smart mobility, an electric vehicle, an intelligent vehicle, a plug-in hybrid EV (PHEV), a hybrid EV (HEV), or a hybrid vehicle.

In an example, the battery apparatus 10 is used for managing a battery pack of a smart appliance, a smart home environment, a smart building environment, components in a smart home environment, a secondary battery, a battery cell, or any battery module capable of being charged and discharged as an energy source. The battery module capable of being charged and discharged may be embedded in or interoperate with various digital devices such as, for example, a mobile phone, a cellular phone, a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, or other consumer electronics/information technology(CE/IT) device.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a necklace, an earring, a headband, a helmet, a device embedded in the cloths, or as an eye glass display (EGD), which includes one-eyed glass or two-eyed glasses. In an example, the battery apparatus 10 may operate as a power source to components that constitute the electronic device and the transportation device.

In an example, the battery pack 100 includes a plurality of battery modules 110-1, 110-2, and 110-3. The plurality of battery modules 110-1, 110-2, and 110-3 may be referred to as a battery. In an example, the plurality of battery modules 110-1, 110-2, and 110-3 are connected in series. Each of the plurality of battery modules 110-1, 110-2, and 110-3 may include a plurality of battery cells. In an example, a battery cell may be a serially connected secondary cell.

In an example, the battery management system 200 includes a master battery management system (M-BMS) 220 and a plurality of slave battery management systems (S-BMSs) 210-1, 210-2, and 210-3. Hereinafter, the master battery management system 220 is referred to as the M-BMS 220 and the slave battery management systems 210-1, 210-2, and 210-3 are referred to as the S-BMSs 210-1, 210-2, and 210-3, respectively.

In an example, the battery pack 100 and the battery management system 200 are connected to each other. For example, the first S-BMS 210-1 is connected to the first battery module 110-1, the second S-BMS 210-2 is connected to the second battery module 110-2, and the third S-BMS 210-3 is connected to the third battery module 110-3.

The battery management system 200 acquires information of the battery pack 100, such as, for example, a voltage, a current and a temperature of each of the plurality of battery modules 110-1, 110-2, and 110-3.

For example, the first S-BMS 210-1 may acquire information of the first battery module 110-1. Likewise, the second S-BMS 210-2 may acquire information of the second battery module 110-2 and the third S-BMS 210-3 may acquire information of the third battery module 110-3.

In an example, the plurality of S-BMSs 210-1, 210-2, and 210-3 transmits the acquired information to the M-BMS 220. In an example, each of the plurality of S-BMSs 210-1, 210-2, and 210-3 and the M-BMS 220 include an antenna. That is, the plurality of S-BMSs 210-1, 210-2, and 210-3 and the M-BMS 220 may perform wireless communication using the antennas.

In an example, the antenna is provided both surfaces of each of the plurality of battery modules 110-1, 110-2, and 110-3. For example, each of the plurality of battery modules 110-1, 110-2, and 110-3 includes an antenna on a first surface and also includes an antenna on a second surface. In an example, the antenna of each of the plurality of battery modules 110-1, 110-2, and 110-3 communicate with the antenna of the corresponding adjacent battery module 110-1, 110-2, or 110-3. The antenna may be configured as a near field communication (NFC) antenna that performs NFC.

Accordingly, the battery apparatus 10 may effectively reduce electromagnetic compatibility (EMC) noise. In addition, since the battery apparatus 10 is in a light and simplified structure, it is possible to enhance energy density and to minimize production cost, maintenance, and repair cost. Since the battery apparatus 10 uses wireless communication instead of using wired communication, it is possible to easily separate and replace the battery cell and to enhance the expandability and application flexibility of the battery cell.

The M-BMS 220 determines a state of the battery pack 100 based on information of the battery pack 100 that is acquired from the plurality of S-BMSs 210-1, 210-2, and 210-3. The state of the battery pack 100 may include any one or any combination of state of charge (SOC), state of health (SOH), cold cranking amp (CCA), polarization resistance (PR), and internal resistance (IR).

For example, the M-BMS 220 determines a state of each of the plurality of battery modules 110-1, 110-2, and 110-3 that constitute the battery pack 100. The M-BMS 220 determines a state of the first battery module 110-1 based on information of the first battery module 110-1. Likewise, the M-BMS 220 determines a state of the second battery module 110-2 based on information of the second battery module 110-2 and determines a state of the third battery module 110-3 based on information of the third battery module 110-3. The M-BMS 220 may control output power of each of the battery modules 110-1, 110-2, and 110-3 based on the determined state.

The battery management system 200 controls a temperature based on information of the battery pack 100. For example, the battery management system 200 controls the temperature of the battery pack 100 using the antenna. Accordingly, the battery apparatus 10 may normally operate in a low temperature environment and may have an extended lifetime.

In an example, the battery management system 200 increases a temperature of the battery module 110-1, 110-2, or 110-3 that is less than or equal to a reference value in the battery pack 100. For example, the battery management system 200 may determine the battery module 110-1, 110-2, or 110-3 of which a temperature is −5° C. or less and may increase the temperature using the antenna. The battery management system 200 may increase the temperature by supplying the voltage or the current to the antenna.

Also, the battery management system 200 performs battery balancing based on information of the battery pack 100. That is, the battery management system 200 performs charging or discharging on the battery pack 100. In an example, the battery management system 200 performs wireless charging or wireless discharging. Here, the battery management system 200 may include a coil configured to perform wireless charging or wireless discharging on an adjacent battery module(s) among the plurality of battery modules 110-1, 110-2, and 110-3.

The coil may be provided on both surfaces of the battery pack 100. For example, each of the plurality of battery modules 110-1, 110-2, and 110-3 may include the coil on the first surface and may also include the coil on the second surface. In an example, the coil of each of the plurality of battery modules 110-1, 110-2, and 110-3 may charge or discharge the corresponding adjacent battery module 110-1, 110-2, or 110-3.

The M-BMS 220 performs charging or discharging on the plurality of S-BMSs 210-1, 210-2, and 210-3 based on the states of the plurality of battery modules 110-1, 110-2, and 110-3, respectively. That is, the plurality of S-BMSs 210-1, 210-2, and 210-3 charge or discharge the plurality of battery modules 110-1, 110-2, and 110-3, respectively, in response to a command of the M-BMS 220.

For example, the M-BMS 220 may perform charging or discharging based on state of charge (SOC) of each of the plurality of battery modules 110-1, 110-2, and 110-3. In an example, the M-BMS 220 determines SOC of each of the plurality of battery modules 110-1, 110-2, and 110-3, and determines that one battery module, for example, the battery module 110-1, corresponding to the minimum SOC.

The M-BMS 220 commands battery modules, for example, the battery modules 110-2 and 110-3, not corresponding to the minimum SOC among the plurality of battery modules 110-1, 110-2, and 110-3. In an example, the M-BMS 220 commands the S-BMSs 210-2 and 210-3 corresponding to the battery modules 110-2 and 110-3. In response to the command, each of the battery modules 110-2 and 110-3, which do not have the minimum SOC, discharge energy to an adjacent battery module(s) among the battery modules 110-1, 110-2, and 110-3. For example, the second battery module 110-2 may discharge energy to the first battery module 110-1 and the third battery module 110-3, and the third battery module 110-3 may discharge energy to the second battery module 110-2.

Also, the M-BMS 220 performs wireless charging and wireless discharging on at least one battery module, for example, the battery module 110-1, corresponding to the minimum SOC among the plurality of battery modules 110-1, 110-2, and 110-3. That is, the M-BMS 220 may command the wireless charging and the wireless discharging to the S-BMS 210-1 of the battery module 110-1 corresponding to the minimum SOC among the plurality of battery modules 110-1, 110-2, and 110-3.

In an example, the battery module corresponding to the minimum SOC, for example, the battery module 110-1, may charge and discharge energy from the adjacent battery module, for example, the battery module 110-2. For example, the first battery module 110-1 may receive, for example, charge energy from the adjacent second battery module 110-2. The second battery module 110-2 may discharge the energy received, for example, charged from the adjacent third battery module 110-3 and energy of the second battery module 110-2 to the first battery module 110-1. The energy of the second battery module 110-2 discharged from the second battery module 110-2 to the first battery module 110-1 may be energy corresponding to a difference between a current charge amount of the second battery module 110-2 and a charge amount of the first battery module 110-1.

In response to the command of the S-BMS 210-1, the first battery module 110-1 discharges the energy received, for example, charged from the second battery module 110-2. For example, the first battery module 110-1 may discharge energy to a low voltage direct current (DC)-to-DC converter (LDC). The LDC may charge an auxiliary battery or may supply power of 12 to 14 $V_{DC}$ to a low voltage load of 0.5 kW to 3 kW.

If all of the battery modules 110-1, 110-2, and 110-3 have the matching SOC, the M-BMS 220 may terminate battery balancing.

For clarity of description, it is described that the plurality of battery modules 110-1, 110-2, and 110-3 are provided outside the battery management system 200. However, it is provided as an example only and they may be provided in the battery management system 200 without departing from the spirit and scope of the illustrative examples described.

Also, although it is illustrated that the battery pack 100 includes three battery modules 110-1, 110-2, and 110-3, it is provided as an example only. The battery pack 100 may include a more or less number of battery modules without departing from the spirit and scope of the illustrative examples described.

Figure 3:
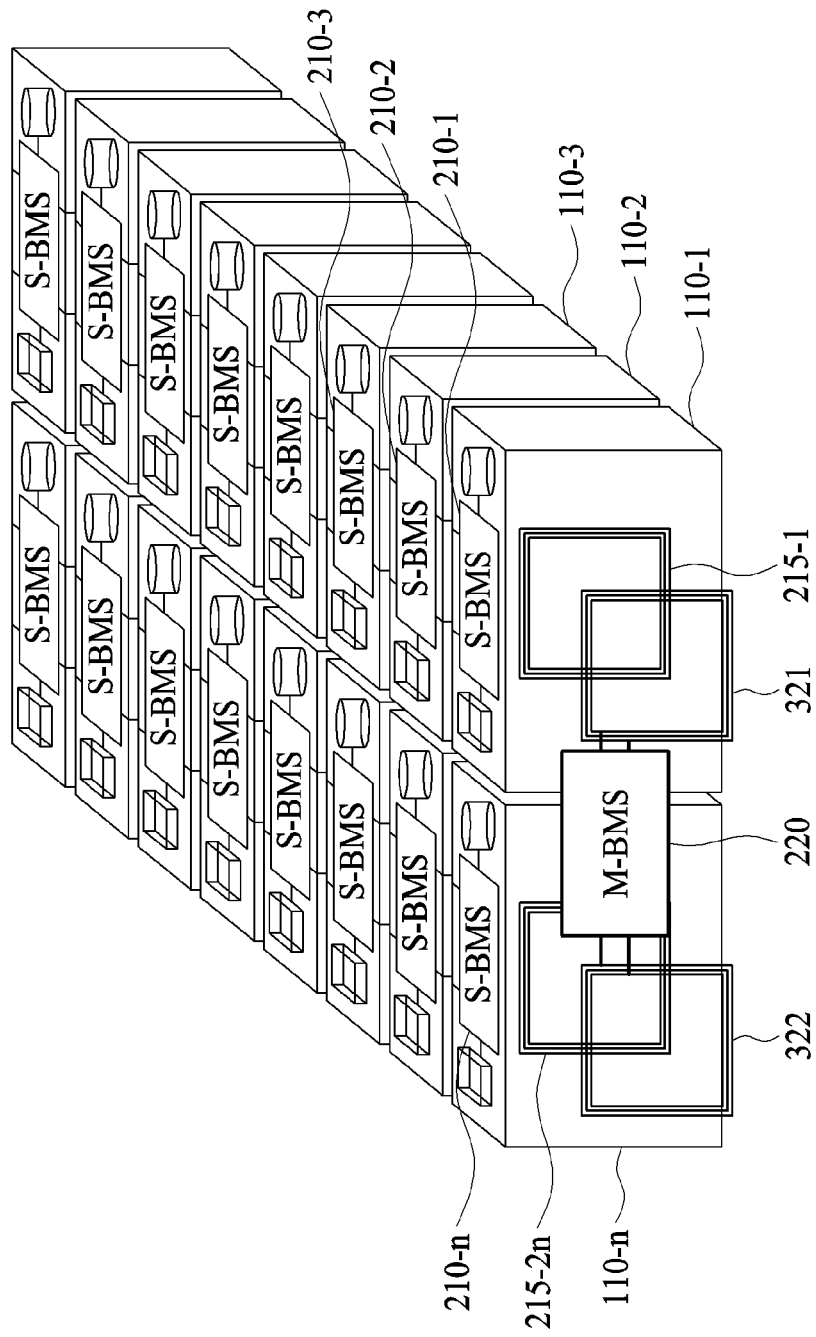
FIG. 3 is a diagram illustrating an example of a battery apparatus.
Figure 4A:
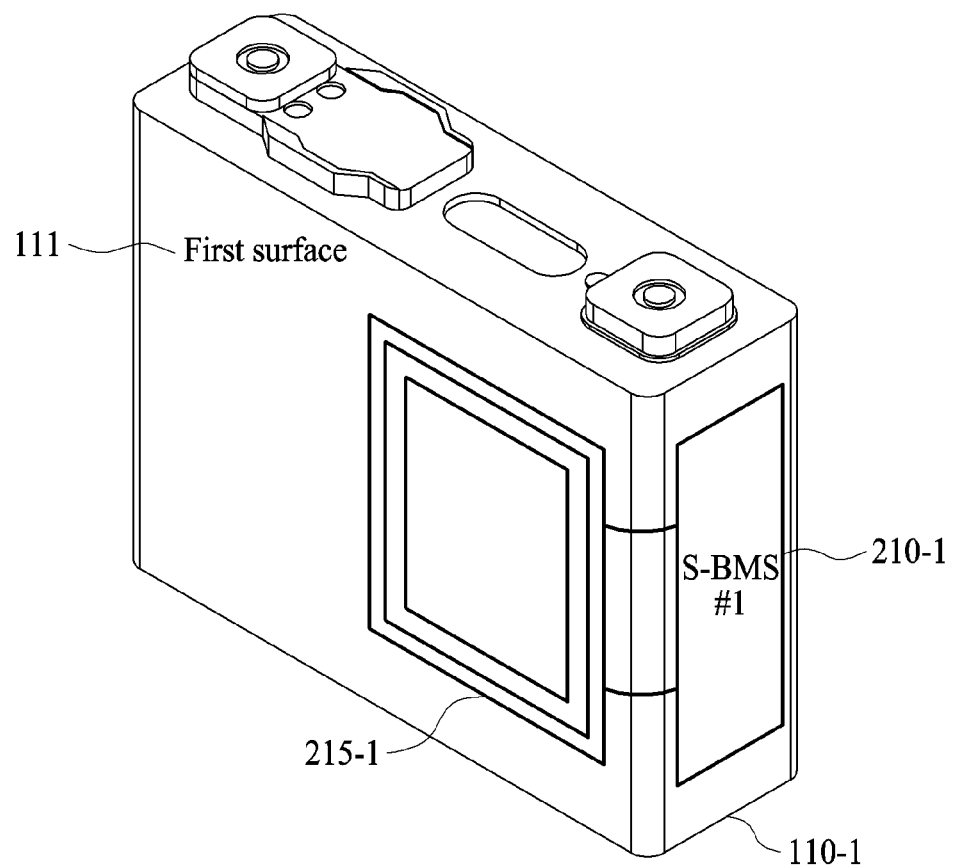
FIG. 4A is a diagram illustrating an example of a first battery module of FIG. 3.
Figure 4B:
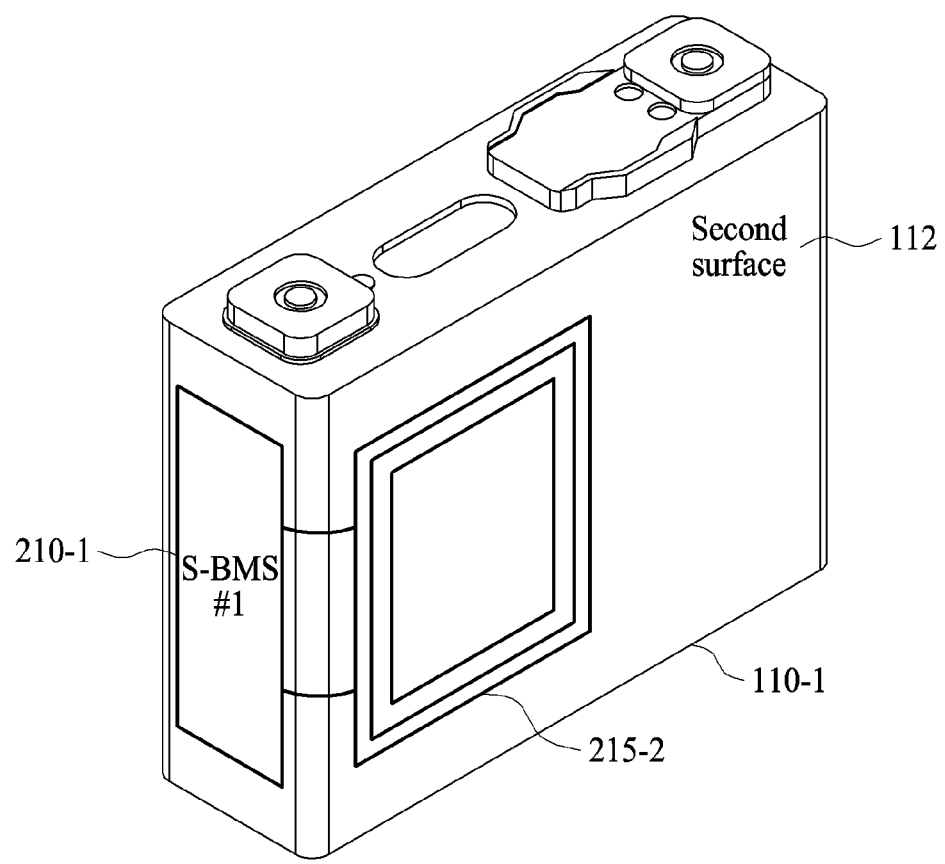
FIG. 4B is a diagram illustrating another example of the first battery module of FIG. 3.

FIG. 3 is a diagram illustrating an example of a battery apparatus, FIG. 4A is a diagram illustrating an example of a first battery module of FIG. 3, and FIG. 4B is a diagram illustrating another example of the first battery module of FIG. 3.

Referring to FIG. 3, the battery apparatus 10 includes the M-BMS 220, first antennas 321 and 322, battery modules 110-1 to **110-*n*, S-BMSs 210-1 to 210-*n*, and second antennas 215-1 to 215-2*n*. The first antennas 321 and 322 and the second antennas 215-1 to 215-2*n*** may be configured as an NFC antenna that performs NFC.

Describing the first battery module 110-1 with reference to FIGS. 4A and 4B, the second antenna 215-1 is provided on a first surface 111 and the second antenna 215-2 is provided on a second surface 112. Although FIGS. 4A and 4B illustrate that the first S-BMS 210-1 is provided at the side of the first battery module 110-1, it is provided as an example only. The first S-BMS 210-1 may be provided on other surfaces of the first battery module 110-1, such as, a top surface or a bottom surface of the first battery module 110-1.

Referring to FIG. 3, the M-BMS 220 may communicate with the S-BMSs 210-1 and **210-*n* of the adjacent battery modules 110-1 and 110-*n* through the first antennas 321 and 322. For example, the M-BMS 220 may communicate with the first S-BMS 210-1 through the first antenna 321 and may communicate with the n-th S-BMS 210-*n* through the first antenna 322. Accordingly, the M-BMS 220 may acquire information of the plurality of battery modules 110-1 to 110-*n***.

The M-BMS 220 transmits a wake-up signal to the first S-BMS 210-1 through the first antenna 321. In response to the wake-up signal, the first S-BMS 210-1 switches from an idle mode to an active mode. Herein, the idle mode refers to a sleep mode and the active mode refers to a mode for acquiring information of a battery module.

In an example, the M-BMS 220 requests the first S-BMS 210-1 of the first battery modules 110-1 to verify a number of battery modules 110-1 to 110-n. For example, the M-BMS 220 may use a controller area network (CAN) message. In an example, once the CAN message passes from the first S-BMS 210-1 to the n-th S-BMS 210-n, the n-th S-BMS 210-n may notify the M-BMS 220 of that the number of battery modules 110-1 to 110-n is n.

The M-BMS 220 may request the plurality of battery modules 110-1 to 110-n for information. For example, the M-BMS 220 may request the first S-BMS 210-1 of the first battery module 110-1 for information of the first battery module 110-1.

The first S-BMS 210-1 acquires information from the connected first battery module 110-1. The information includes characteristics of the battery module such as, for example, any one or any combination of a voltage, a current, and a temperature. The first S-BMS 210-1 acquires any one or any combination of the voltage, the current, and the temperature of the first battery module 110-1.

The first S-BMS 210-1 transmits the acquired information and the request of the M-BMS 220 to the second S-BMS 210-2 through the second antenna 215-2. In an example, the second S-BMS 210-2 receives the information and the request from the first S-BMS 210-1 through the second antenna 215-3.

The second S-BMS 210-2 acquires information regarding any one or any combination of the voltage, the current, and the temperature of the connected second battery module 110-2 and transmits the acquired information to the third S-BMS 210-3.

Likewise, the (n−1)-th S-BMS 210-n−1 transmits the acquired information and the request of the M-BMS 220 to the n-th S-BMS 210-n through the second antenna 215-2n−2. Here, the n-th S-BMS 210-n receives the information from the (n−1)-th S-BMS 210-n−1 through the second antenna 215-2n−1.

The n-th S-BMS 210-n transmits the acquired information of the plurality of battery modules 110-1 to 110-n to the M-BMS 220. In an example, the n-th S-BMS 210-n transmits information of the plurality of battery modules 110-1 to 110-n through the second antenna 215-2n. In an example, the M-BMS 220 receives the information of the plurality of battery modules 110-1 to 110-n through the first antenna 322.

The M-BMS 220 determines a state of each of the plurality of plurality of battery modules 110-1 to 110-n based on information of the battery modules 110-1 to 110-n. In an example, the state includes any one or any combination of SOC, SOH, cold cranking amp (CCA), polarization resistance (PR), and internal resistance (IR) of each of the battery modules 110-1 to 110-n.

In an example, the M-BMS 220 transmits the state of each of the plurality of battery modules 110-1 to 110-n to the plurality of battery modules 110-1 to 110-n, each of the plurality of battery modules 110-1 to 110-n store the received state.

Figure 5A:
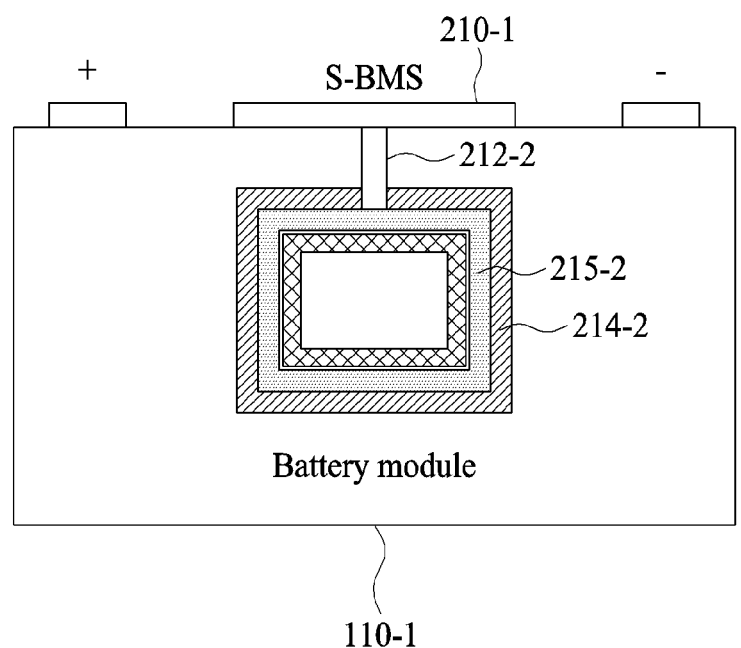
FIG. 5A is a diagram illustrating an example of the first battery module of FIG. 3.
Figure 5B:
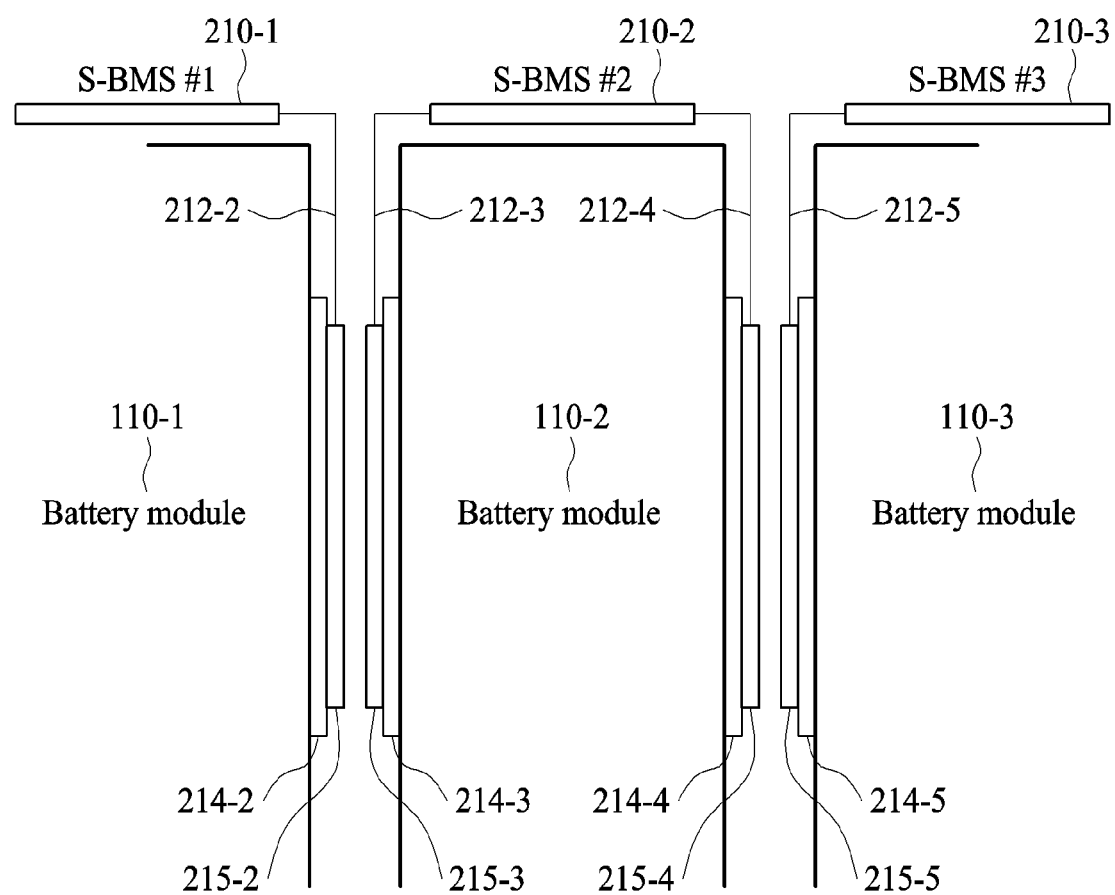
FIG. 5B is a diagram illustrating an example of the first battery module of FIG. 3.

FIG. 5A is a diagram illustrating an example of the first battery module of FIG. 3, and FIG. 5B is a diagram illustrating an example of the first battery module of FIG. 3.

Referring to FIGS. 5A and 5B, the battery modules 110-1, 110-2, and 110-3 include the S-BMSs 210-1, 210-2, and 210-3, and the second antennas 215-2, 215-3, 215-4, and 215-5.

In an example, the second antennas 215-2, 215-3, 215-4, and 215-5 are provided on ferrite sheets 214-2, 214-3, 214-4, and 214-5, respectively. For example, each of the ferrite sheets 214-2, 214-3, 214-4, and 214-5 may include a protection circuit board (PCB). In an example, the second antennas 215-2, 215-3, 215-4, and 215-5 are formed on the respective PCBs. In an example, the PCB is a flexible PCB.

In an example, the S-BMSs 210-1, 210-2, and 210-3 and the second antennas 215-2, 215-3, 215-4, and 215-5 are connected using stubs 212-2, 212-3, 212-4, and 212-5. The stubs 212-2, 212-3, 212-4, and 212-5 may assist communication between the S-BMSs 210-1, 210-2, and 210-3 and the second antennas 215-2, 215-3, 215-4, and 215-5. In an example, each of the stubs 212-2, 212-3, 212-4, and 212-5 has a maximum length of 5 to 10 cm, and may quickly transmit and receive a command and information.

For example, the first S-BMS 210-1 may control the stub 212-2 through the second antenna 215-2. In response to a command of the first S-BMS 210-1, the second antenna 215-2 may transmit information to the second antenna 215-3. The second antenna 215-3 may transmit the received information to the second S-BMS 210-2 through the stub 212-3. The second S-BMS 210-2 may transmit the information to the second antenna 215-4 through the stub 212-4.

In an example, in response to a command of the second S-BMS 210-2, the second antenna 215-4 of battery module 110-2 may transmit information to the second antenna 215-5 of battery module 110-3. The second antenna 215-5 may transmit the received information to the third S-BMS 210-3 through the stub 212-5.

Figure 6:
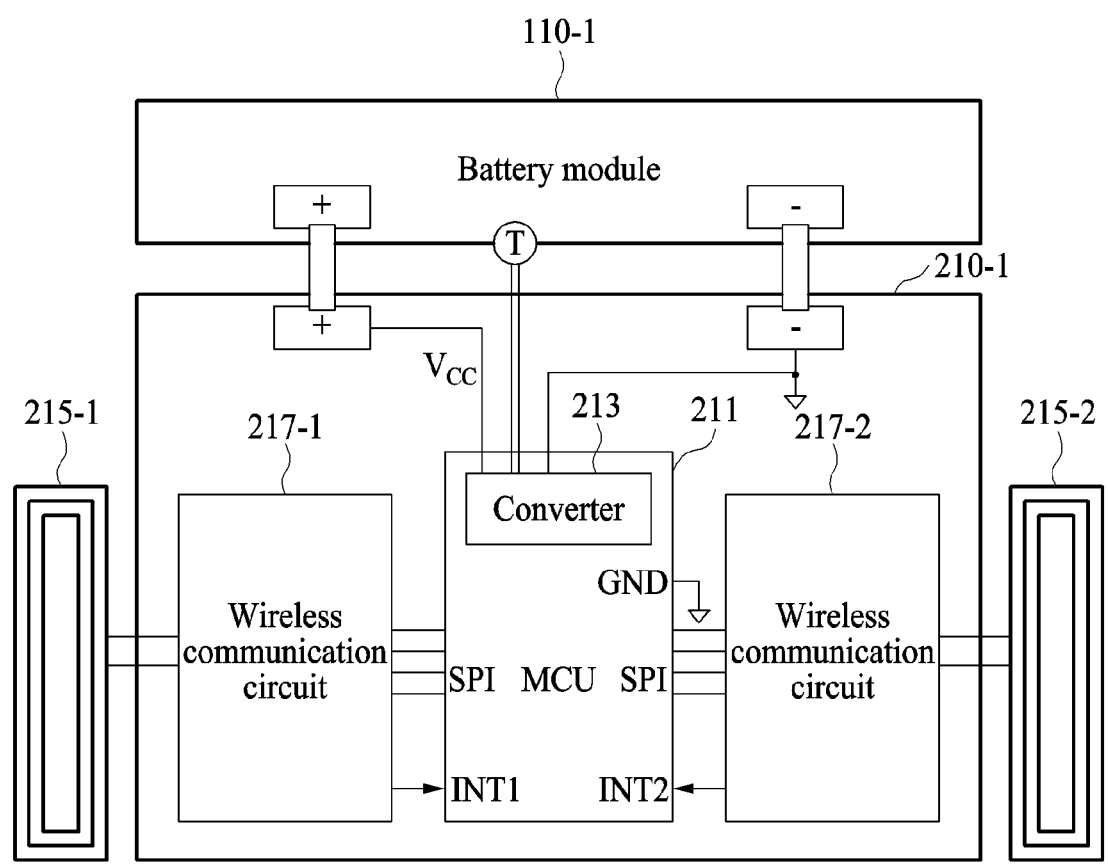
FIG. 6 illustrates an example of a slave battery management system (S-BMS) of FIG. 3.

FIG. 6 illustrates an example of an S-BMS of FIG. 3.

Referring to FIG. 6, the first S-BMS 210-1 may connect to the first battery module 110-1 to fit a polarity. For example, a + pole of the first S-BMS 210-1 and a + pole of the first battery module 110-1 are connected to each other, and a − pole of the first S-BMS 210-1 and a − pole of the first battery module 110-1 are connected to each other.

In an example, the first S-BMS 210-1 includes a controller 211, a converter 213, second antennas 215-1 and 215-2, and wireless communication circuits 217-1 and 217-2.

The controller 211 controls the overall operation of the first S-BMS 210-1. For example, the controller 211 controls the first S-BMS 210-1 to acquire information of the first battery module 110-1, to convert the acquired information, to transmit the converted information, or to receive information of an adjacent battery module. In an example, the controller 211 is a micro controller unit (MCU).

In response to a command of the controller 211, the converter 213 acquires and converts information of the first battery module 110-1. In an example, the converter 213 converts analog information to a digital signal. The converter 213 may be configured as an analog-to-digital (A/D) converter.

In response to the command of the controller 211, the wireless communication circuits 217-1 and 217-2 transmit the converted digital signal to the second antennas 215-1 and 215-2, respectively.

Each of the second antennas 215-1 and 215-2 transmits the converted digital signal to an adjacent antenna, for example, an adjacent first or second antenna.

Figure 7:
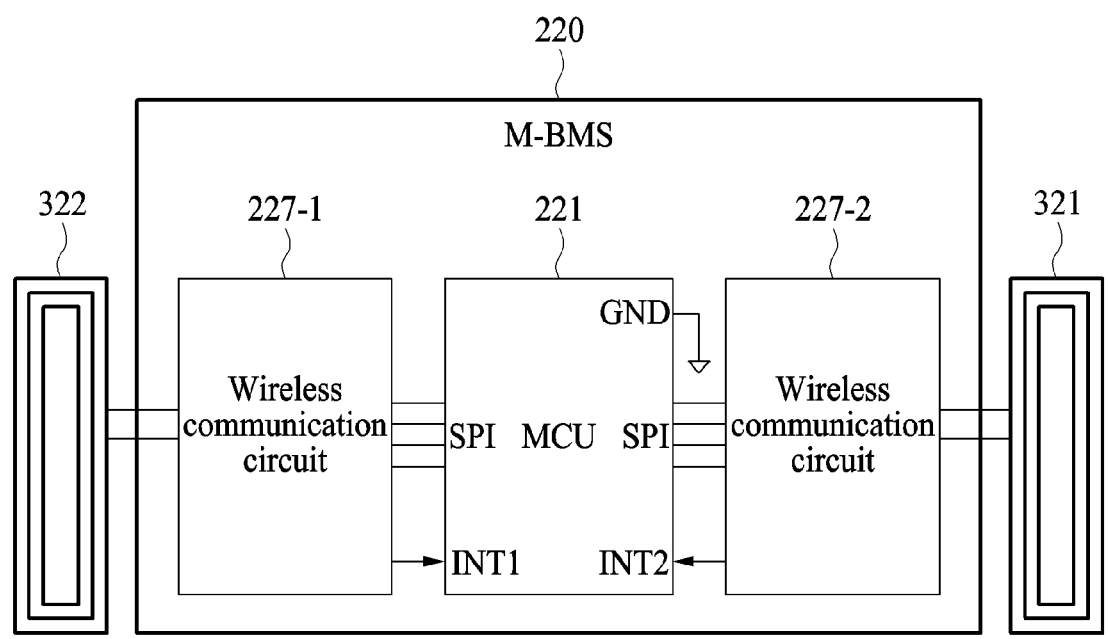
FIG. 7 illustrates an example of a master battery management system (M-BMS) of FIG. 3.

FIG. 7 illustrates an example of an M-BMS of FIG. 3.

Referring to FIG. 7, the M-BMS 220 includes a controller 221, first antennas 321 and 322, and wireless communication circuits 227-1 and 227-2. Configurations and operations of the first antennas 321 and 322, and the wireless communication circuits 227-1 and 227-2 of FIG. 7 may be substantially identical to those of the second antennas 215-1 and 215-2 and the wireless communication circuits 217-1 and 217-2 of FIG. 6. Accordingly, a further description related thereto is omitted.

The controller 221 controls the overall operation of the M-BMS 220. The controller 221 may be configured as an MCU. In an example, the controller 221 controls transmission and reception of a request, a command, and/or information with respect to the S-BMSs 210-1 to 210-n of the plurality of battery modules 110-1 to 110-n. The controller 221 requests and acquires information of the plurality of battery modules 110-1 to 110-n.

The controller 221 determines a state of each of the plurality of battery modules 110-1 to 110-n based on information acquired from the plurality of battery modules 110-1 to 110-n. The controller 221 transmits the determined state to the S-BMSs 210-1 to 210-n through the first antenna 321 and 322 and the wireless communication circuit 227-1 and 227-2. The first antennas 321 and 322 transmit the determined state to an adjacent second antenna.

Figure 8:
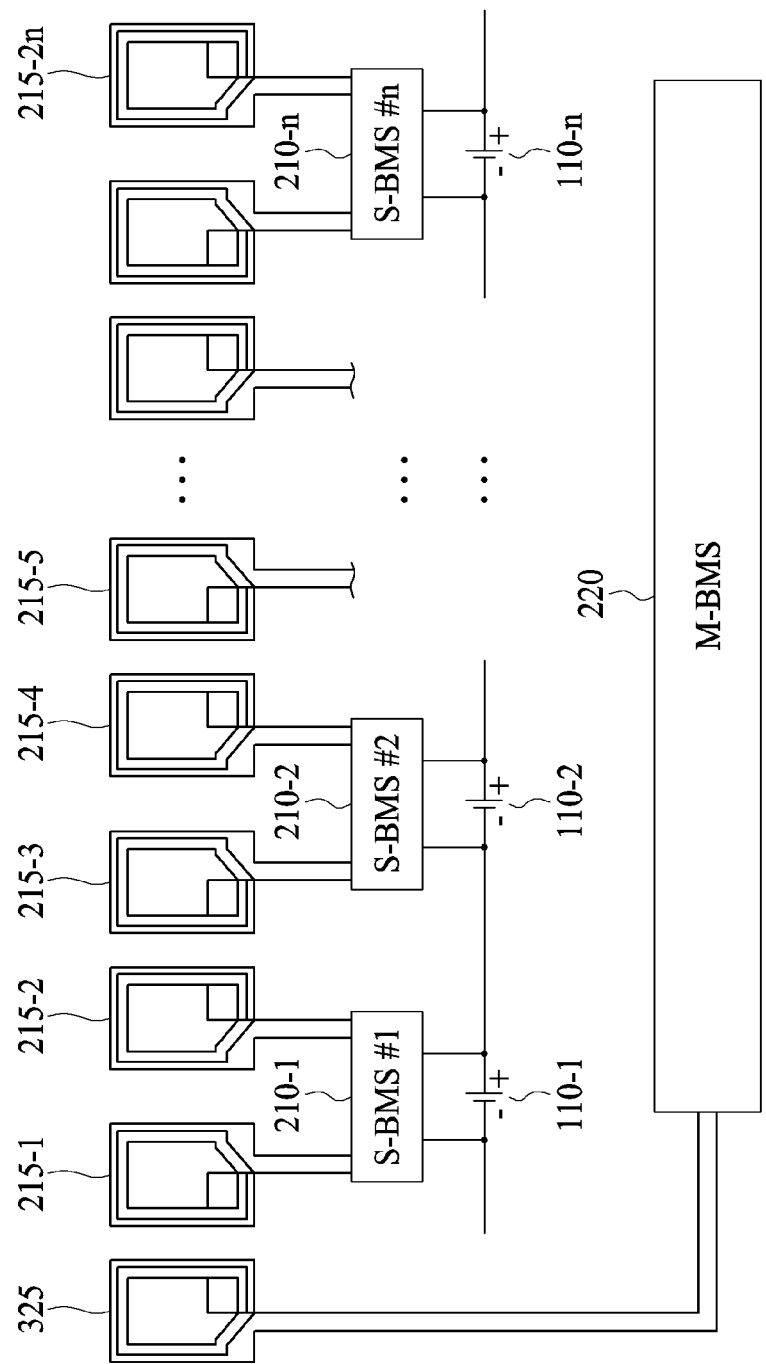
FIG. 8 illustrates an example of describing an operation of the battery apparatus of FIG. 1.

FIG. 8 illustrates an example of an operation the battery apparatus of FIG. 1.

Referring to FIG. 8, the battery apparatus 10 includes the M-BMS 220, a first antenna 325, battery modules 110-1 to 110-n, S-BMSs 210-1 to 210-n, and second antennas 215-1 to 215-2n.

In an example, the M-BMS 220 transmits a wake-up signal to the first S-BMS 210-1 through the first antenna 325 and requests information of the battery modules 110-1 to 110-n.

In response to the wake-up signal received through the second antenna 215-1, the first S-BMS 210-1 switches from an idle mode to an active mode and acquires information of the first battery module 110-1. The first antenna 325 and the second antenna 215-1 that adjacently face each other are referred as an antenna pair. The first S-BMS 210-1 transmits the acquired information of the first battery modules 110-1 to the second S-BMS 210-2 through the second antenna 215-2.

The second S-BMS 210-2 acquires information of the first battery module 110-1 through the second antenna 215-3, switches from the idle mode to the active mode, and acquires information of the second battery module 110-2. Likewise, the second antenna 215-2 and the second antenna 215-3 that adjacently face each other are an antenna pair.

The n-th S-BMS 210-n acquires information of the battery modules 110-1 to 110-n−1 through the second antenna 215-2n−1, switches from the idle mode to the active mode, and acquires information of the n-th battery module 110-n. The n-th S-BMS 210-n transmits the acquired information of the battery modules 110-1 to 110-n to the (n−1)-th S-BMS 210-n−1. That is, in an example, the n-th S-BMS 210-n may transmit information of the battery modules 110-1 to 110-n in a reverse direction.

Once the first S-BMS 210-1 acquires information of the battery modules 110-1 to 110-n, the first S-BMS 210-1 transmits information of the battery modules 110-1 to 110-n to the M-BMS 220 through the second antenna 215-1.

The M-BMS 220 acquires information of the battery modules 110-1 to 110-n through the first antenna 325 and determines a state of each of the battery modules 110-1 to 110-n. The M-BMS 220 may control output power of the battery modules 110-1 to 110-n based on the states of the battery modules 110-1 to 110-n.

Figure 9:
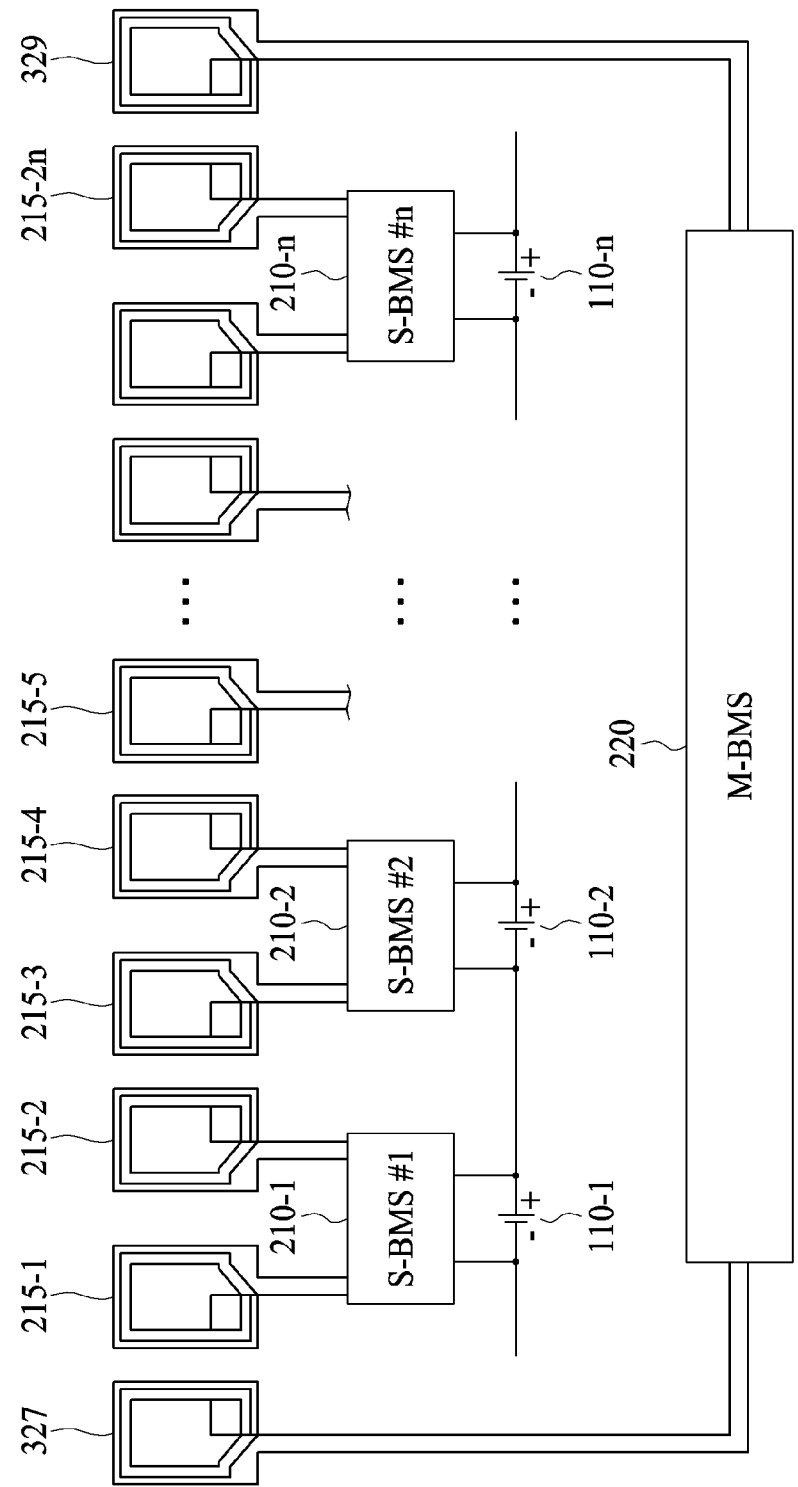
FIG. 9 illustrates an example of describing an operation of the battery apparatus of FIG. 1.

FIG. 9 illustrates an example of an operation of the battery apparatus of FIG. 1.

Referring to FIG. 9, the battery apparatus 10 includes the M-BMS 220, first antennas 327 and 329, battery modules 110-1 to 110-n, S-BMSs 210-1 to 210-n, and second antennas 215-1 to 215-2n.

The M-BMS 220 transmits a wake-up signal to the first S-BMS 210-1 through the first antenna 327 and requests information of the battery modules 110-1 to 110-n. The first S-BMS 210-1 acquires information of the first battery module 110-1 and transmits the acquired information to the adjacent second S-BMS 210-2.

The same principle described with reference to FIG. 8 may be applied here. In addition to the description of FIG. 9, the applicable description of FIG. 8 is incorporated herein by reference. Thus, the above description may not be repeated here. The n-th S-BMS 210-n acquires information of the battery modules 110-1 to 110-n−1 through the second antenna 215-2n−1, switches from an idle mode to an active mode, and acquires information of the n-th battery module 110-n.

The n-th S-BMS 210-n transmits the acquired information of the battery modules 110-1 to 110-n to the M-BMS 220 through the second antenna 215-2n. That is, the M-BMS 220 acquires information of the battery modules 110-1 to 110-n through the first antenna 329 and determines a state of each of the battery modules 110-1 to 110-n. The M-BMS 220 may control output power of the battery modules 110-1 to 110-n based on the states of the battery modules 110-1 to 110-n.

Figure 10:
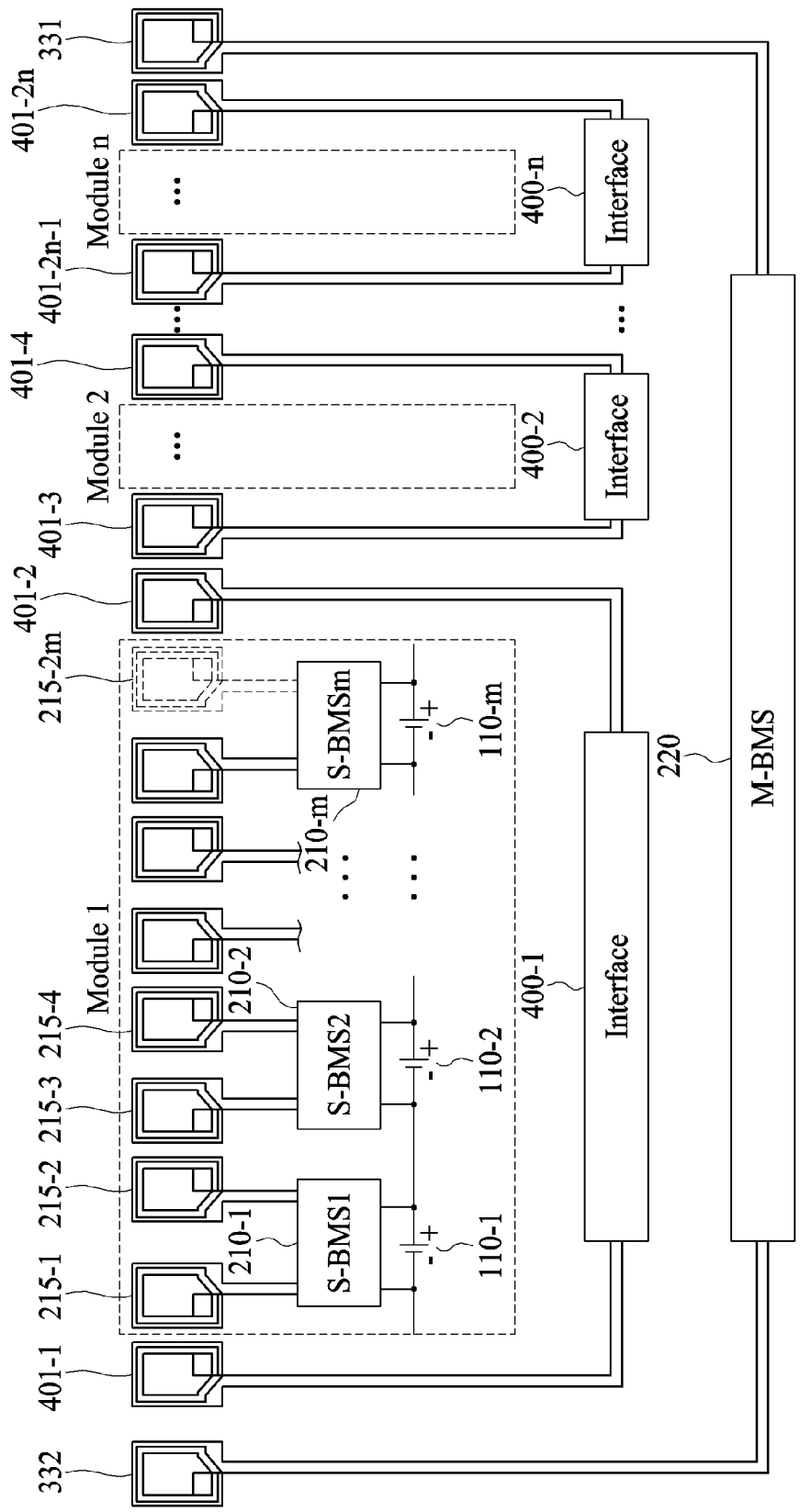
FIG. 10 illustrates an example of describing an operation of the battery apparatus of FIG. 1.

FIG. 10 illustrates an example of an operation of the battery apparatus of FIG. 1.

Referring to FIG. 10, the battery apparatus 10 includes the M-BMS 220, first antennas 331 and 332, battery modules 110-1 to 110-m, S-BMSs 210-1 to 210-m, second antennas 215-1 to 215-2m, interfaces 400-1 to 400-n and third antennas 401-1 to 401-2n.

Configurations and operations of the interfaces 400-1 to 400-n may be substantially identical to those of the M-BMS 220. The configuration and the operation of the M-BMS 220 are described with reference to FIG. 7. In addition to the description below, the applicable description of FIG. 7 is incorporated herein by reference. Thus, the above description may not be repeated here.

In an example, the first interface 400-1 controls a module 1. The module 1 includes the battery modules 110-1 to 110-m, the S-BMSs 210-1 to 210-m, and the second antennas 215-1 to 215-2m. The second interface 400-2 controls a module 2, and the n-th interface 400-n controls a module n.

The first interface 400-1 transmits a request, a command, and/or information to the S-BMSs 210-1 to 210-m through the third antenna 401-1. Also, the first interface 400-1 acquires information of the battery modules 110-1 to 110-m through the third antenna 401-2. The first interface 400-1 transmits information of the battery modules 110-1 to 110-m to the M-BMS 220 through the third antenna 401-1.

Likewise, each of the remaining interfaces 400-2 to 400-n may acquire information of corresponding battery modules and may transmit the acquired information to the M-BMS 220.

Accordingly, a transmission and reception rate of information may be enhanced by performing wireless communication between the S-BMSs 210-1 to 210-m within the module 1 and by performing wireless communication between the interfaces 400-1 to 400-n and the M-BMS 220 outside the module 1.

Figure 11:
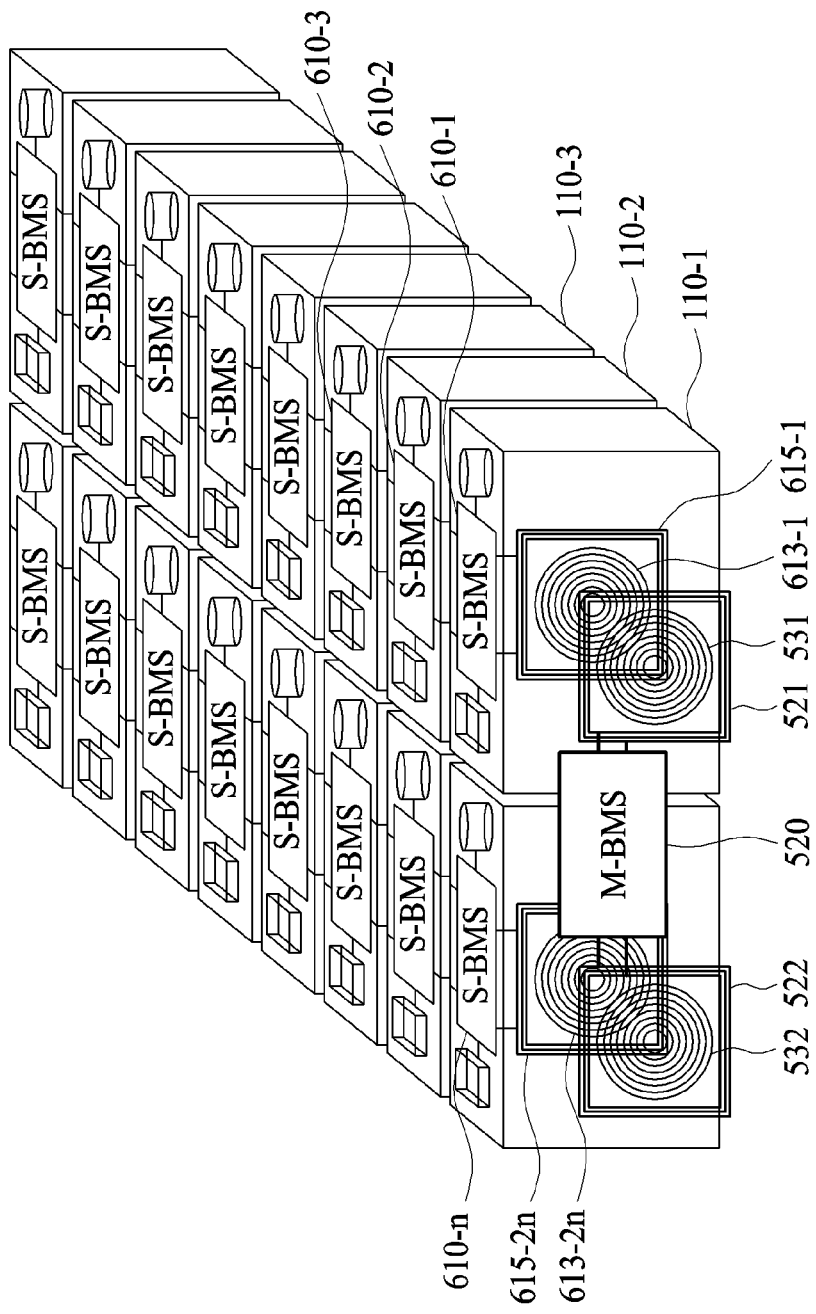
FIG. 11 is a diagram illustrating an example of a battery apparatus.
Figure 12A:
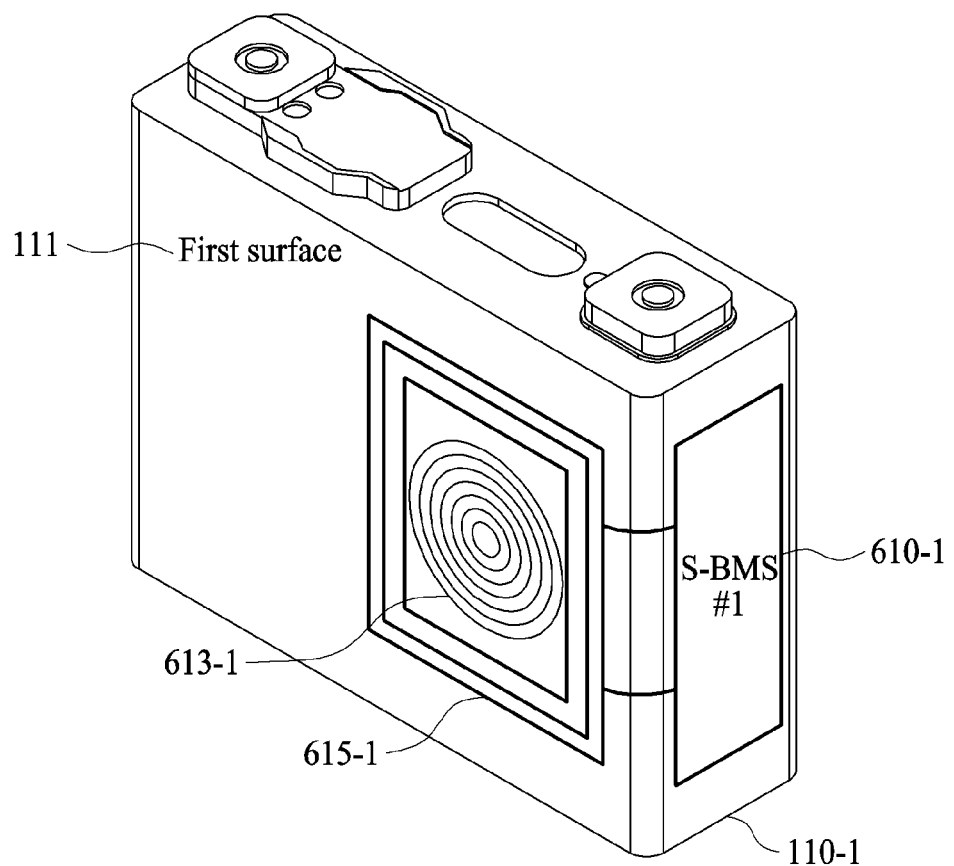
FIG. 12A is a diagram illustrating an example of a first battery module of FIG. 11.
Figure 12B:
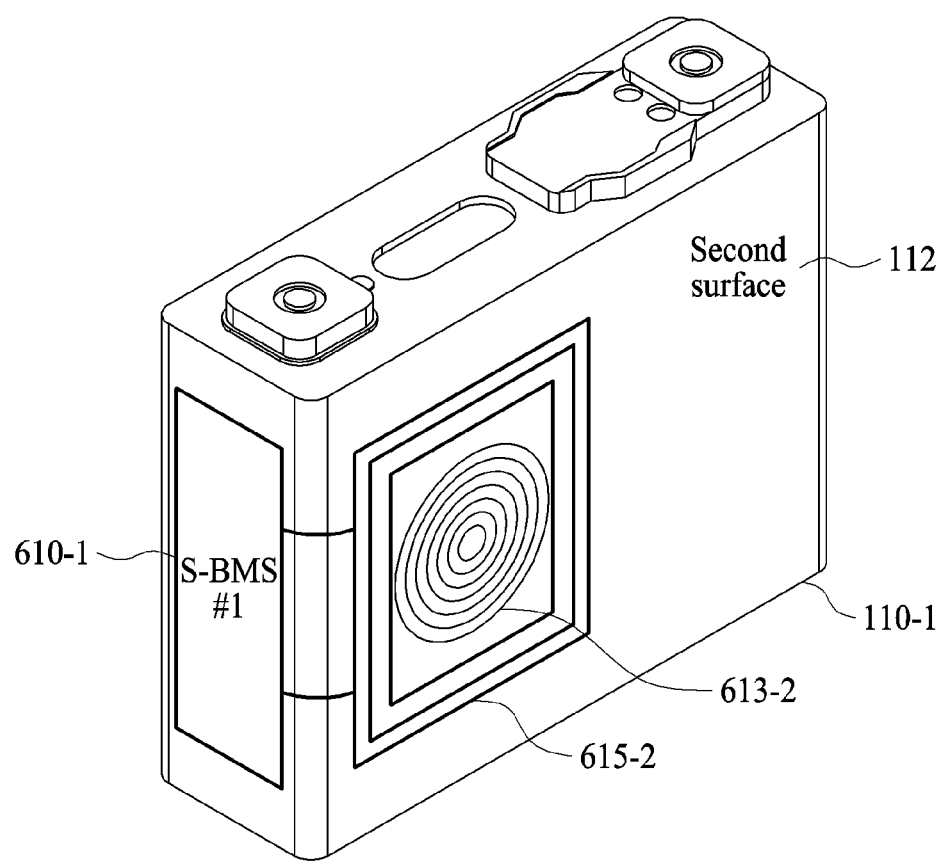
FIG. 12B is a diagram illustrating an example of the first battery module of FIG. 11.

FIG. 11 is a diagram illustrating an example of a battery apparatus, FIG. 12A is a diagram illustrating an example of a first battery module of FIG. 11, and FIG. 12B is a diagram illustrating an example of the first battery module of FIG. 11.

Referring to FIG. 11, the battery apparatus 10 includes an M-BMS 520, first antennas 521 and 522, first coils 531 and 532, battery modules 110-1 to 110-n, S-BMSs 610-1 to 610-n, second antennas 615-1 to 615-2n, and second coils 613-1 to 613-2n.

Configurations and operations of the M-BMS 520, the first antennas 521 and 522, the first coils 531 and 532, the battery modules 110-1 to 110-*n*, the S-BMSs 610-1 to 610-*n*, and the second antennas 615-1 to 615-2*n* of FIG. 11 may be substantially identical to those of the M-BMS 220, the first antennas 321 and 322, the battery modules 110-1 to 110-*n*, the S-BMSs 210-1 to 210-*n*, and the second antennas 215-1 to 215-2*n* that have been described with reference to FIG. 3, and the applicable description of FIG. 3 is incorporated herein by reference. Thus, the above description may not be repeated here.

Describing the first battery module 110-1 with reference to FIGS. 12A and 12B, the second antenna 615-1 is provided on the first surface 111 and the second antenna 615-2 is provided on the second surface 112. For clarity of description, although FIGS. 12A and 12B illustrate that the first S-BMS 610-1 is provided at the side of the first battery module 110-1, it is provided as an example only. The first S-BMS 610-1 may be provided on any surface, such as, for example, a top surface or a bottom surface of the first battery module 110-1.

Referring to FIG. 11, the battery apparatus 10 performs battery balancing through the first coils 531 and 532 and the second coils 613-1 to 613-2*n*. The first coils 531 and 532 are provided at both sides of the M-BMS 520, respectively. The second coils 613-1 to 613-2*n* are provided at both sides of the respective corresponding battery modules 110-1 to 110-*n*.

The M-BMS 520 performs wireless charging or wireless discharging based on information of the battery modules 110-1 to 110-*n*. In an example, the M-BMS 520 determines a state of each of the battery modules 110-1 to 110-*n* based on information of the battery modules 110-1 to 110-*n*. In an example, the M-BMS 520 performs charging or discharging on each of the S-BMSs 610-1 to 610-*n* based on the state of each of the battery modules 110-1 to 110-*n*. In response to a command of the M-BMS 520, each of the S-BMSs 610-1 to 610-*n* may perform wireless charging or wireless discharging using the respective corresponding second coils 613-1 to 613-2*n*.

The M-BMS 520 performs charging or discharging based on SOC of each of the battery modules 110-1 to 110-*n*. The M-BMS 520 determines SOC of each of the battery modules 110-1 to 110-*n* and determines at least one battery module, for example, the battery module 110-1, corresponding to the minimum SOC.

In an example, the M-BMS 520 commands a battery module, for example, the battery modules 110-2 to 110-*n*, not corresponding to the minimum SOC among the battery modules 110-1 to 110-*n*. That is, the M-BMS 520 sends a command for wireless charging to the S-BMSs 210-2 to 210-*n* of the battery modules 110-2 to 110-*n* excluding the battery module 110-1 corresponding to the minimum SOC among the battery modules 110-1 to 110-*n*. Accordingly, each of the battery modules 110-2 to 110-*n* not corresponding to the minimum SOC may discharge energy to an adjacent battery module(s) using the second coils 613-1 to 613-2*n*. In an example, the energy discharged from each of the battery modules 110-2 to 110-*n* may be energy corresponding to a difference between a charge amount of each of the battery modules 110-2 to 110-*n* and a charge amount of the first battery module 110-1.

Also, the M-BMS 520 performs wireless charging and wireless discharging on at least one battery module, for example, the battery module 110-1 corresponding to the minimum SOC among the battery modules 110-1 to 110-*n*. That is, the M-BMS 520 may command wireless charging and wireless discharging to the S-BMS 210-1 of the battery module 110-1 corresponding to the minimum SOC among the battery modules 110-1 to 110-*n*. The at least one battery module, for example, the battery module 110-1 corresponding to the minimum SOC may charge and discharge energy from the adjacent battery modules 110-2 to 110-*n* using the second coils 613-1 and 613-2.

In response to the command of the S-BMS 210-1, the first battery module 110-1 discharges the energy received, for example, charged from the adjacent battery modules 110-2 to 110-*n*. For example, the first battery module 110-1 may discharge the energy to the M-BMS 520 or an low voltage direct current (DC)-to-DC converter (LDC) using the second coils 613-1 and 613-2.

The M-BMS 520 or the LDC may perform wireless charging using the first coils 531 and 532. The M-BMS 520 or the LDC may charge an auxiliary battery or may supply power to a low voltage load. For example, the M-BMS 520 or the LDC may supply the power of 12 to 14$V_{DC}$ to the low voltage load of 0.5 kW to 3 kW.

If all of the battery modules 110-1 to 110-*n* have the matching SOC, the M-BMS 520 may terminate battery balancing.

Figure 13:
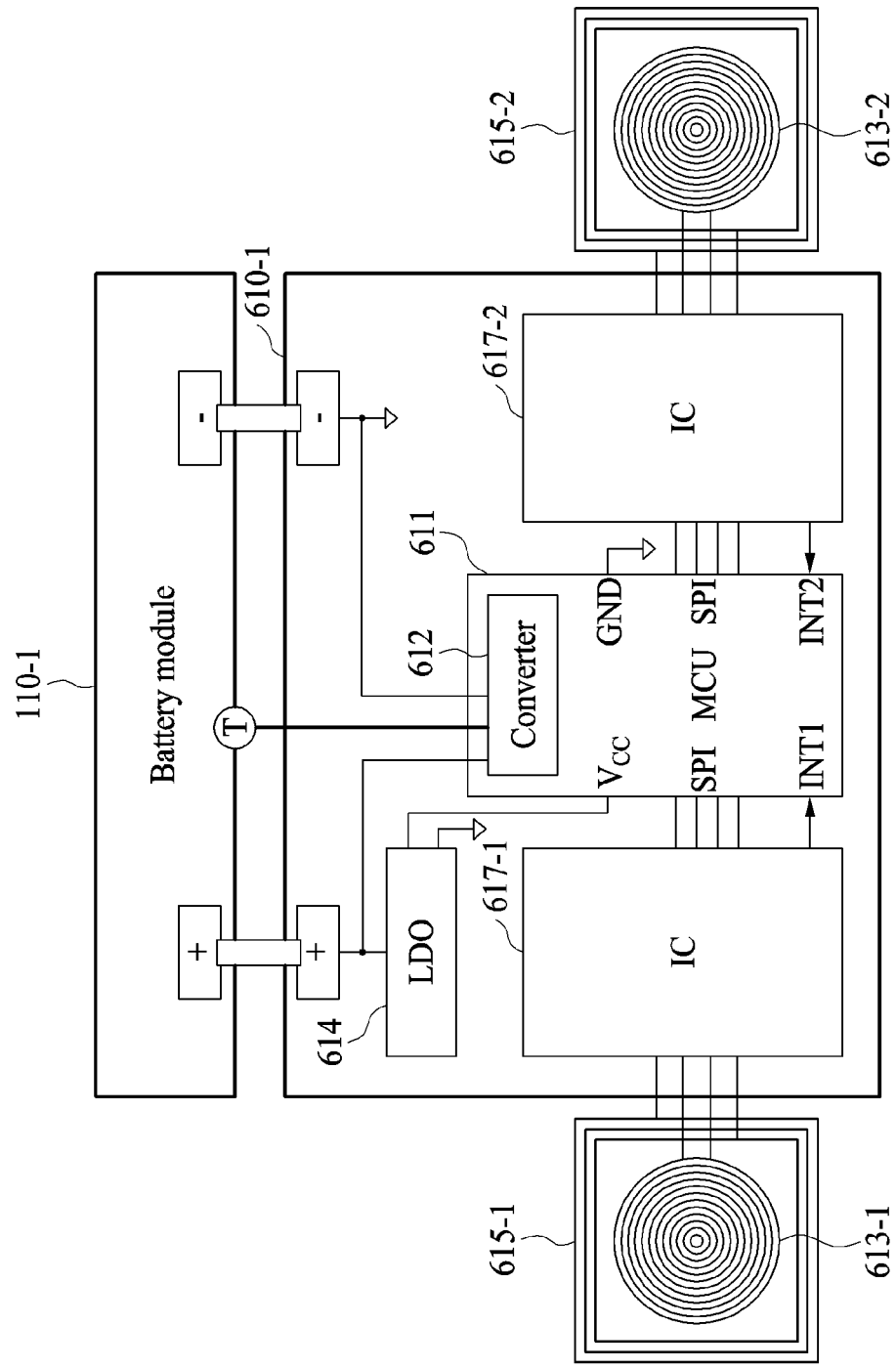
FIG. 13 illustrates an example of an S-BMS of FIG. 11.

FIG. 13 illustrates an example of an S-BMS of FIG. 11.

Referring to FIG. 13, the first S-BMS 610-1 may connect to the first battery module 110-1 to fit a polarity. For example, a + pole of the first S-BMS 610-1 and a + pole of the first battery module 110-1 are connected to each other, and a − pole of the first S-BMS 610-1 and a − pole of the first battery module 110-1 are connected to each other.

The first S-BMS 610-1 includes a controller 611, a converter 612, second coils 613-1 and 613-2, a linear regulator 614, second antennas 615-1 and 615-2, and integrated circuits (ICs) 617-1 and 617-2.

Configurations and operations of the controller 611, the converter 612, and the second antennas 615-1 and 615-2 of FIG. 13 may be substantially identical to those of the controller 211, the converter 213, and the second antennas 215-1 and 215-2 of FIG. 6, and the applicable description of FIG. 6 is incorporated herein by reference. Accordingly, the above description may not be repeated here.

The first S-BMS 610-1 transmits information of the first battery module 110-1 to the M-BMS 520, and performs battery balancing in response to a command of the M-BMS 520.

The linear regulator 614 controls a voltage that is input to the controller 611. For example, the linear regulator 614 may control a voltage of 2.5 to 3V to be input to the controller 611. The linear regulator 614 may be configured as a low drop out (LDO) regulator.

The controller 611 controls the overall operation of the first S-BMS 610-1. For example, the controller 611 may control the first S-BMS 610-1 to acquire information of the first battery module 110-1, to convert the acquired information, to transmit the converted information, or to receive information of an adjacent battery module. The controller 611 may be configured as an MCU.

In response to the control, for example, a command of the controller 611, the converter 612 converts the acquired information. For example, the converter 612 may convert the acquired information to a digital signal.

In response to the control, for example, the command of the controller 611, the ICs 617-1 and 617-2 output the converted digital signal to the second antennas 615-1 and 615-2, respectively.

Each of the second antennas 615-1 and 615-2 transmits the converted digital signal to an adjacent antenna, for example, an adjacent first or second antenna.

Also, in response to the control, for example, the command of the controller 611, the ICs 617-1 and 617-2 output a charging signal or a discharging signal to the second coils 613-1 and 613-2, respectively.

In response to the command of the first S-BMS 610-1, each of the second coils 613-1 and 613-2 may perform wireless charging or wireless discharging on an adjacent battery module.

Figure 14:
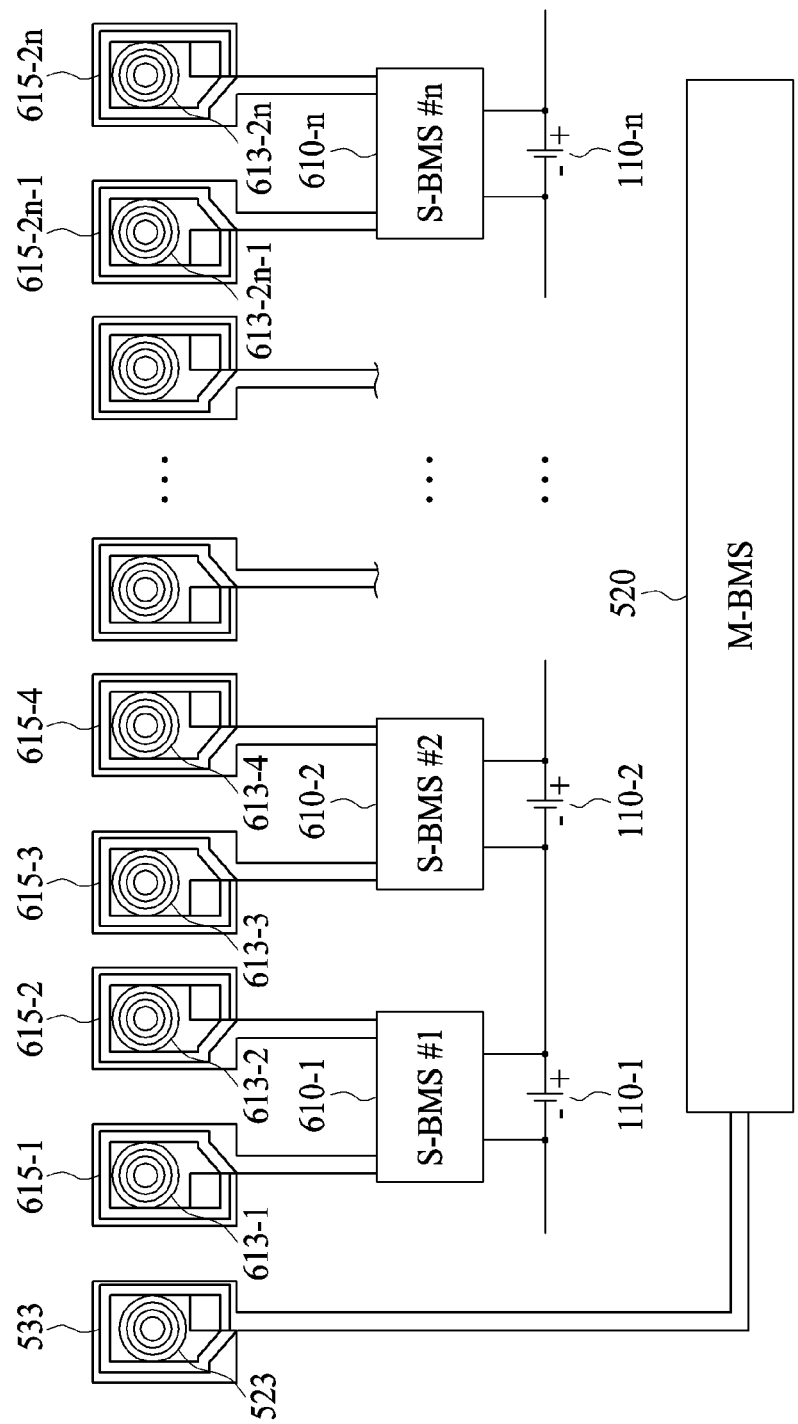
FIG. 14 illustrates an example of describing an operation of the battery apparatus of FIG. 1.

FIG. 14 illustrates an example of describing an operation of the battery apparatus of FIG. 1.

Referring to FIG. 14, the battery apparatus 10 includes the M-BMS 520, a first antenna 533, a first coil 523, battery modules 110-1 to 110-n, S-BMS 610-1 to 610-n, second coils 613-1 to 613-2n, and second antennas 615-1 to 615-2n.

Configurations and operations of the M-BMS 520, the first antenna 533, the battery modules 110-1 to 110-n, the S-BMSs 610-1 to 610-n, and the second antennas 615-1 to 615-2n of FIG. 14 may be substantially identical to those of the M-BMS 220, the first antenna 325, the battery modules 110-1 to 110-n, the S-BMSs 210-1 to 210-n, and the second antennas 215-1 to 215-2n of FIG. 8, and the applicable description of FIG. 8 is incorporated herein by reference. Accordingly, the above description may not be repeated here.

The M-BMS 520 performs battery balancing using the first coil 523. For example, the M-BMS 520 may charge or discharge energy through the first coil 523.

The M-BMS 520 determines a state of each of the battery modules 110-1 to 110-n based on information of the battery modules 110-1 to 110-n. The M-BMS 520 performs battery balancing based on the states of the battery modules 110-1 to 110-n.

For example, the M-BMS 520 may determine at least one battery module corresponding to the minimum SOC among the battery modules 110-1 to 110-n.

The M-BMS 520 may send a command for discharging to an S-BMS, for example, at least one of the S-BMSs 610-1 to 610-n, of a battery module, for example, at least one of the battery modules 110-1 to 110-n, not corresponding to the minimum SOC. The M-BMS 520 may discharge energy until the S-BMS, for example, at least one of the S-BMSs 610-1 to 610-n, of the battery module, for example, at least one of the battery modules 110-1 to 110-n, not corresponding to the minimum SOC reaches the minimum SOC.

The M-BMS 520 may send a command for charging and discharging to an S-BMS, for example, at least one of the S-BMSs 610-1 to 610-n, of a battery module, for example, at least one of the battery modules 110-1 to 110-n, corresponding to the minimum SOC. That is, the S-BMS, for example, at least one of the S-BMSs 610-1 to 610-n, of the battery module, for example, at least one of the battery modules 110-1 to 110-n, corresponding to the minimum SOC may pass the energy transferred from an adjacent battery module among the battery modules 110-1 to 110-n.

The M-BMS 520 or the LDC performs wireless charging using the first coil 523. The M-BMS 520 or the LDC charges an auxiliary battery or supplies the power to a low voltage load. For example, the M-BMS 520 or the LDC may supply power of 12 to 14$V_{DC}$ to the low voltage load of 0.5 kW to 3 kW.

If all of the battery modules 110-1 to 110-n have the matching SOC, the M-BMS 520 may terminate battery balancing.

Figure 15:
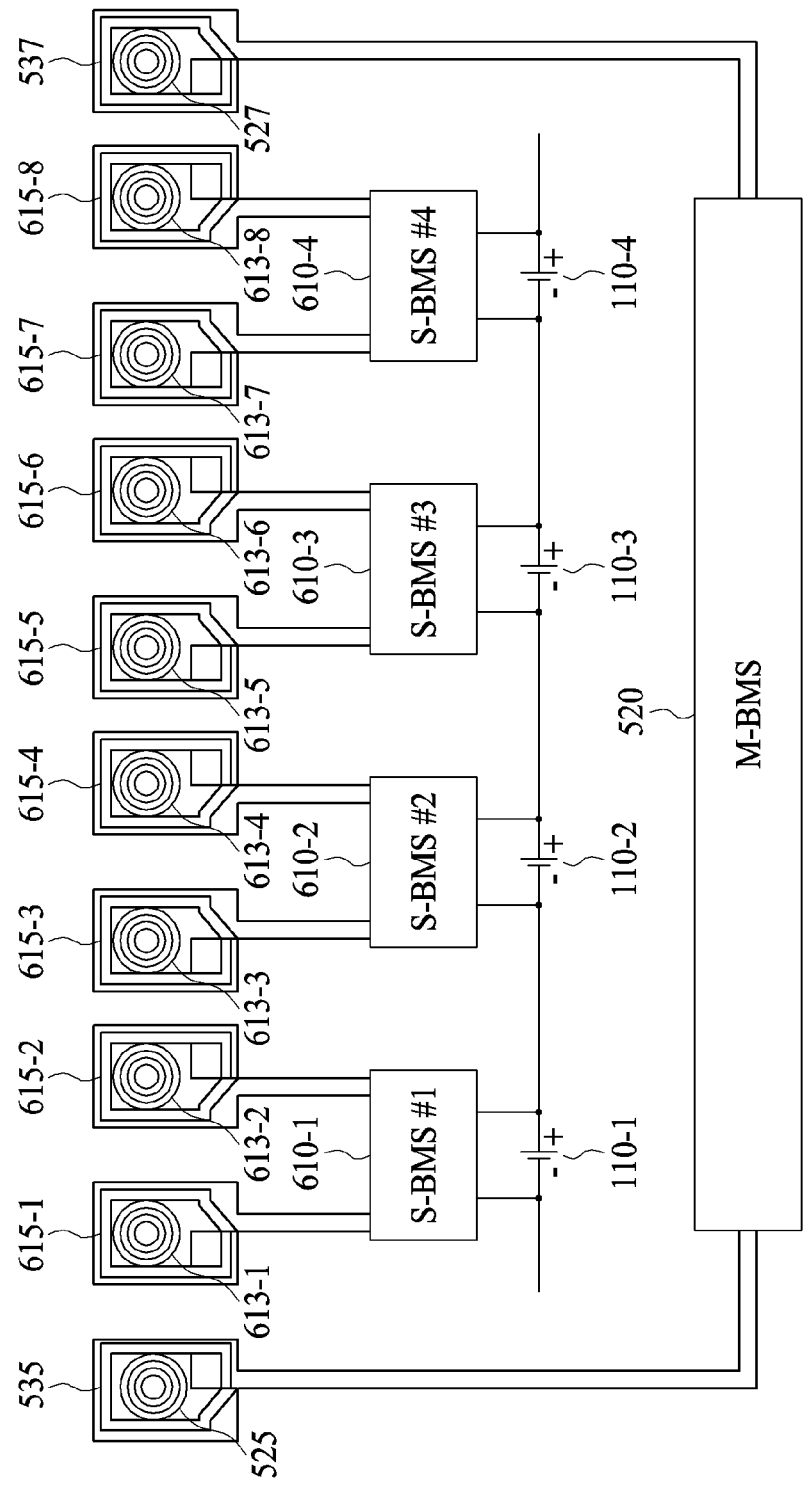
FIG. 15 illustrates an example of describing an operation of the battery apparatus of FIG. 1.

FIG. 15 illustrates an example of an operation of the battery apparatus of FIG. 1.

Referring to FIG. 15, the battery apparatus 10 includes the M-BMS 520, first antennas 535 and 537, first coils 525 and 527, battery modules 110-1 to 110-4, S-BMSs 610-1 to 610-4, second coils 613-1 to 613-8, and second antennas 615-1 to 615-8.

Here, it is assumed that a charge rate of the first battery module 110-1 is 80%, a charge rate of the second battery module 110-2 is 80%, a charge rate of the third battery module 110-3 is 70%, and a charge rate of the fourth battery module 110-4 is 70%. For clarity of description, the charging rates of the battery modules 110-1 to 110-4 are arbitrarily set and are not limited thereto. Other charging rates may be used without departing from the spirit and scope of the illustrative examples described.

The M-BMS 520 performs battery balancing using the first coils 525 and 527. For example, the M-BMS 520 may charge or discharge energy through the first coils 525 and 527.

In an example, the M-BMS 520 determines that the battery modules 110-3 and 110-4 correspond to the minimum SOC based on information of the battery modules 110-1 to 110-4. The SOC may include a charge rate.

The M-BMS 520 commands discharging to the S-BMSs 610-1 and 610-2 of the battery modules 110-1 and 110-2, which do not correspond to the minimum SOC. That is, the M-BMS 520 commands the S-BMSs 610-1 and 610-2 of the battery modules 110-1 and 110-2 until the SOC of each of the battery modules 110-1 and 110-2 reaches the minimum SOC. The battery modules 110-1 and 110-2 may discharge the energy until the charging rate reaches 70%.

For example, the first battery module 110-1 may discharge energy through the second coils 613-1 and 613-2. The M-BMS 520 or an LDC may receive the energy discharged through the second coil 613-1 through the first coil 525. The second battery module 110-2 may receive the energy discharged through the second coil 613-2 through the second coil 613-3.

Also, the second battery module 110-2 may discharge the energy through the second coils 613-3 and 613-4. That is, the second battery module 110-2 may discharge the energy to the first battery module 110-1 or the third battery module 110-3.

The M-BMS 520 commands charging and discharging to the S-BMSs 610-3 and 610-4 of the battery modules 110-3 and 110-4 corresponding to the minimum SOC. That is, the S-BMSs 610-3 and 610-4 of the battery module 110-3 and 110-4 corresponding to the minimum SOC may pass the energy transferred from the adjacent battery modules 110-1 and 110-2.

The third battery module 110-3 and the fourth battery module 110-4 may pass the energy received from the first battery module 110-1 and the second battery module 110-2. The fourth battery module 110-4 may discharge the energy through the second coils 613-7 and 613-8. The M-BMS 520 or the LDC may receive the energy discharged through the second coil 613-8 through the first coil 527.

The M-BMS 520 or the LDC may charge an auxiliary battery or may supply power to a low voltage load using the energy charged from the first coils 525 and 527. For example, the M-BMS 520 or the LDC may supply the power of 12 to 14$V_{DC}$ to the low voltage load of 0.5 kW to 3 kW.

If all of the battery modules 110-1 to 110-4 have the matching SOC, the M-BMS 520 may terminate battery balancing.

For clarity of description, although FIG. 15 illustrates four battery modules 110-1 to 110-4, it is provided as an example only. Accordingly, a number of S-BMSs, a number of second coils, and a number of second antennas may vary based on a number of battery modules.

Figure 16:
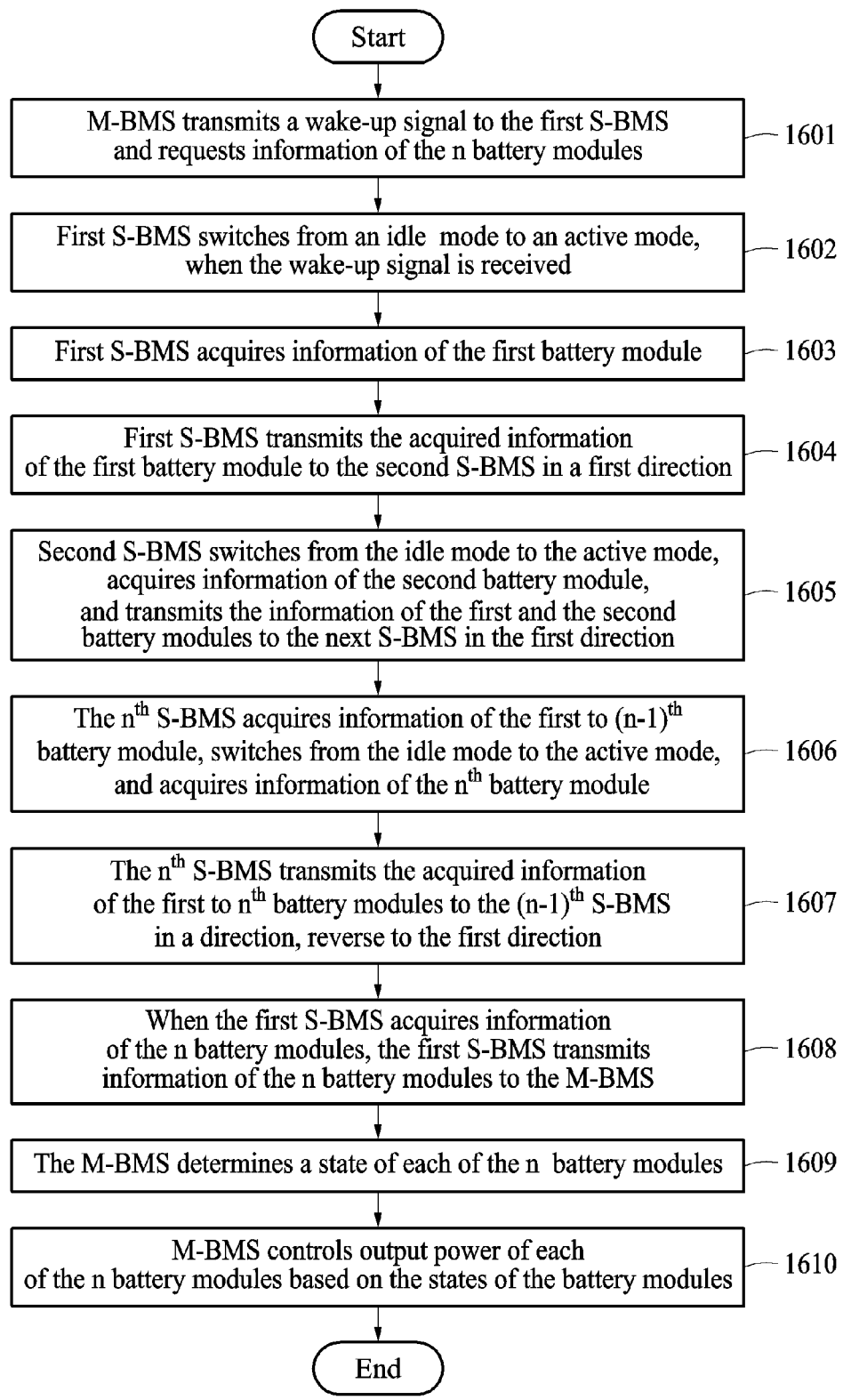
FIGS. 16-17 illustrate examples of methods of operating the battery apparatus of FIG. 1.

FIG. 16 illustrates an example of a method of operating the battery apparatus of FIG. 1. The operations in FIG. 16 may be performed in the sequence and manner as shown, although the order of some operations may be changed or some of the operations omitted without departing from the spirit and scope of the illustrative examples described. Many of the operations shown in FIG. 16 may be performed in parallel or concurrently. One or more blocks of FIG. 16, and combinations of the blocks, can be implemented by special purpose hardware-based computer that perform the specified functions, or combinations of special purpose hardware and computer instructions. In addition to the description of FIG. 16 below, the descriptions of FIGS. 1-15 are also applicable to FIG. 16, and are incorporated herein by reference. Thus, the above description may not be repeated here.

In an example, in Step 1601, an M-BMS transmits a wake-up signal to a first S-BMS from among a plurality of S-MBSs and requests information of the n battery modules. In an example the wake-up signal is transmitted using the first antenna of the M-BMS. In an example, the wake-up signal is received by first of the two second antennas of the first S-BMS. In step 1602, when the wake-up signal is received, the first S-BMS switches from an idle mode to an active mode. In Step 1603, the first S-BMS acquires information of the first battery module from among a plurality of battery modules.

In Step 1604, the first S-BMS transmits the acquired information of the first battery module to the next S-BMS in a first direction, i.e., to the second S-BMS, through the second of the two second antenna of the first S-BMS.

In Step 1605, the second S-BMS acquires information of the first battery module through first of its two second antennas, switches from the idle mode to the active mode, and acquires information of the second battery module from among the plurality of battery modules. Likewise, in step 1606, the $n^{th}$ S-BMS acquires information of the first battery module to the $(n-1)^{th}$ battery module through first of two second antennas of the $n^{th}$ S-BMS. The $n^{th}$ S-BMS switches from the idle mode to the active mode, and acquires information of the $n^{th}$ battery module. In Step 1607, the $n^{th}$ S-BMS transmits the acquired information of the first to $n^{th}$ battery modules to the $(n-1)^{th}$ S-BMS in a second direction, i.e., the $n^{th}$ S-BMS transmits information of all the battery modules in a reverse direction. Thus, the second direction is opposite to the first direction.

In Step 1608, the first S-BMS transmits information of all the n battery modules to the M-BMS through the first of its two second antennas, when the first S-BMS acquires information of all the n battery modules.

In Step 1609, the M-BMS acquires information of the n battery modules through the first antenna and determines a state of each of the n battery modules. In Step 1610, the M-BMS controls output power of each of the n battery modules based on the states of the battery modules. In an example, the M-BMS commands the wireless charging or the wireless discharging of a battery module based on the state of adjacent battery module.

Figure 17:
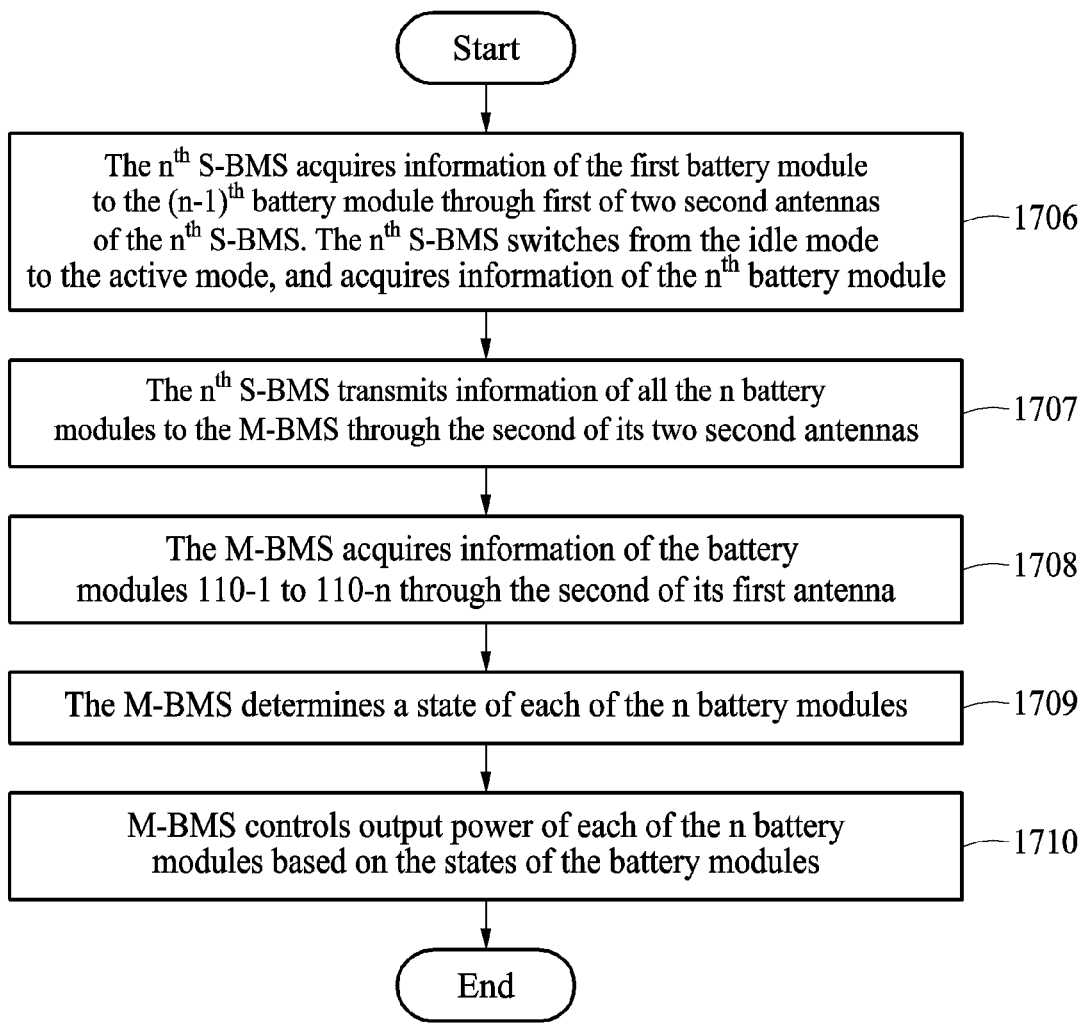

FIG. 17 illustrates an example of a method of operating the battery apparatus of FIG. 1. The operations in FIG. 17 may be performed in the sequence and manner as shown, although the order of some operations may be changed or some of the operations omitted without departing from the spirit and scope of the illustrative examples described. Many of the operations shown in FIG. 17 may be performed in parallel or concurrently. One or more blocks of FIG. 17, and combinations of the blocks, can be implemented by special purpose hardware-based computer that perform the specified functions, or combinations of special purpose hardware and computer instructions. In addition to the description of FIG. 17 below, the descriptions of FIGS. 1-16 are also applicable to FIG. 17, and are incorporated herein by reference. Thus, the above description may not be repeated here.

The description of steps 1601-1605 of FIG. 16 is applicable to FIG. 17 and is incorporated herein by reference. In step 1706, the nth S-BMS acquires information of the first battery module to the (n−1)th battery module through first of two second antennas of the nth S-BMS. The nth S-BMS switches from the idle mode to the active mode, and acquires information of the nth battery module. In Step 1707, the $n^{th}$ S-BMS transmits information of all the n battery modules to the M-BMS through the second of its two second antennas. In Step 1708, the M-BMS acquires information of the battery modules 110-1 to 110-$n$ through the second of its first antenna. In Step 1709, the M-BMS determines a state of each of the n battery modules. In Step 1710, the M-BMS controls output power of each of the n battery modules based on the states of the battery modules.

The battery management system (BMS), master battery management system (M-BMS), slave battery management systems (S-BMSs), controller 211, 221, 611, converter 213, 612, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery management apparatus comprising:
a converter configured to acquire and to convert information of a battery cell, of plural battery cells;
at least two antennas configured respectively to transmit the converted information to an adjacent battery cell, of the plural battery cells and to receive converted information of the adjacent battery cell, in response to a command of a controller; and
a coil configured to wirelessly charge or discharge the adjacent battery cell, in response to another command of the controller,
wherein the controller is configured to:
determine which battery cell, of the plural battery cells, has a minimum state of charge (SOC); and
control the wireless charging or the wireless discharging based on information of the adjacent battery cell, using a result of the determining,
wherein each of the antennas is provided respectively on two opposing surfaces of the battery cell.

2. The battery management apparatus of claim 1, wherein each of the antennas is configured as a near field communication (NFC) antenna.

3. The battery management apparatus of claim 1, wherein information of the battery cell comprises any one or any combination of a voltage, a current, and a temperature of the battery cell.

4. The battery management apparatus of claim 1, wherein the converter is an analog-to-digital (A/D) converter configured to convert information of the battery cell to a digital signal.

5. A battery management apparatus comprising:
a plurality of batteries;
a first controller configured to determine a state of each of the plurality of batteries based on information acquired from the plurality of batteries; and a first antenna configured to receive the information from the plurality of batteries and to transmit the state to the plurality of batteries in response to a command of the first controller, wherein each of the plurality of batteries comprises:

a battery cell;

a converter configured to acquire and convert information of the battery cell;

a second controller configured to control transmission and reception of the converted information;

a second antenna configured to transmit the converted information to an adjacent battery cell and to receive converted information of the adjacent battery cell, in response to a command of a second controller; and a coil configured to wirelessly charge or discharge the adjacent battery cell, in response to another command of the second controller, wherein the second controller is configured to control the wireless charging or the wireless discharging based on information of the adjacent battery cell, and wherein the information comprises information of the battery cell that is included in each of the plurality of batteries.

6. The battery management apparatus of claim 5, wherein the plurality of batteries are connected in series.

7. The battery management apparatus of claim 5, wherein the first antenna and the second antenna are configured as a near field communication (NFC) antenna.

8. The battery management apparatus of claim 5, wherein the second antenna is provided on two opposing surfaces of the battery cell.

9. The battery management apparatus of claim 5, wherein information of the battery cell comprises any one or any combination of a voltage, a current, and a temperature of the battery cell.

10. The battery management apparatus of claim 5, wherein the converter is an analog-to-digital (ND) converter configured to convert information of the battery cell to a digital signal.

11. The battery management apparatus of claim 5, wherein the state comprises any one or any combination of state of charge (SOC) and state of health (SOH) of each of the plurality of batteries.

12. The battery management apparatus of claim 5, wherein the first controller is further configured to perform battery balancing on the plurality of batteries based on the information.

13. The battery management apparatus of claim 12, wherein the first controller is further configured to control the second controller to wireless charge or wireless discharge the adjacent battery cell based on the information.

14. The battery management apparatus of claim 12, wherein the first controller is further configured to perform the battery balancing based on SOC of the plurality of batteries.

15. The battery management apparatus of claim 14, wherein the first controller is further configured to determine at least one battery having a minimum SOC, and to control the second controller to wirelessly discharge a battery, excluding the at least one battery, from among the plurality of batteries.

16. The battery management apparatus of claim 14, wherein the first controller is further configured to determine at least one battery having a minimum SOC, and to control the second controller of the at least one battery to wireless discharge energy wirelessly charged from an adjacent battery.

17. The battery management apparatus of claim 14, wherein the first controller is further configured to terminate the battery balancing, in response to the plurality of batteries having a matching SOC.

18. The battery management apparatus of claim 5, wherein the second controller is further configured to provide a count of a number of the plurality of batteries to the first controller.

19. The battery management apparatus of claim 5, wherein the first controller is further configured to adjust a temperature of one or more of the plurality of batteries based on a comparison of the temperature of the one or more of the plurality of batteries with a reference temperature.

20. The battery management apparatus of claim 5, wherein the state of each of the plurality of batteries comprises any one or any combination of State of Charge (SOC), State of Health (SOH), cold cranking amp (CCA), polarization resistance (PR), and internal resistance (IR).

21. The battery management apparatus of claim 5, wherein the second antenna is provided on a ferrite sheet.

* * * * *